United States Patent
Masuda et al.

(10) Patent No.: US 7,671,901 B2
(45) Date of Patent: Mar. 2, 2010

(54) IMAGE PROCESSING APPARATUS AND MOBILE TERMINAL APPARATUS

(75) Inventors: Kozo Masuda, Yokohama (JP); Yasutaka Tsuru, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 1246 days.

(21) Appl. No.: 11/195,870

(22) Filed: Aug. 3, 2005

(65) Prior Publication Data

US 2006/0215044 A1      Sep. 28, 2006

(30) Foreign Application Priority Data

Mar. 22, 2005   (JP)   ............................. 2005-080846

(51) Int. Cl.
   *H04N 5/235*   (2006.01)
(52) U.S. Cl. ................. 348/229.1; 348/362; 348/224.1; 348/225.1; 348/226.1
(58) Field of Classification Search .............. 348/220.1, 348/221.1, 224.1–229.1, 362; 382/162, 165, 382/167, 168, 172; 358/3.23, 500
See application file for complete search history.

(56) References Cited

U.S. PATENT DOCUMENTS

| | | | | |
|---|---|---|---|---|
| 5,034,804 | A | * | 7/1991 | Sasaki et al. ............. 348/231.4 |
| 5,949,496 | A | * | 9/1999 | Kim ........................... 348/645 |
| 6,292,228 | B1 | | 9/2001 | Cho |
| 7,158,173 | B2 | | 1/2007 | Lee et al. |
| 2002/0145678 | A1 | | 10/2002 | Suzuki et al. |
| 2004/0013296 | A1 | * | 1/2004 | Aotsuka ..................... 382/162 |
| 2004/0228460 | A1 | * | 11/2004 | Keramane .............. 379/110.01 |
| 2004/0247199 | A1 | | 12/2004 | Murai et al. |

FOREIGN PATENT DOCUMENTS

| | | |
|---|---|---|
| CN | 1241098 A | 1/2000 |
| CN | 1426228 A | 6/2003 |
| CN | 1531331 | 9/2004 |
| JP | 2002-132225 A | 5/2002 |
| JP | 2002-262303 A | 9/2002 |

OTHER PUBLICATIONS

Chinese Notification of Second Office Action, with English Translation, issued in Chinese Patent Application No. CN 2005100917191, dated Mar. 28, 2008.

Chinese Office Action issued in Chinese Patent Application No. 2005100917191 dated Sep. 28, 2007.

* cited by examiner

*Primary Examiner*—Yogesh K Aggarwal

(74) *Attorney, Agent, or Firm*—McDermott Will & Emery LLP

(57) ABSTRACT

An image processing apparatus has an input portion for receiving video signals, an illumination sensor for detecting illumination of an environmental light, a corrector for correcting the video signals, and a controller for controlling the corrector to correct the video signals in accordance with distribution of luminance or hue or saturation of the video signals and with the detected illumination when any change occurs in the video signal. The apparatus further has a detector for detecting a change of the video signals in accordance with a mean value of luminance of the inputted video signals, a corrector for correcting the video signals, and a controller for controlling the correction portion to correct the video signals in accordance with distribution of luminance or hue or saturation of the video signals when the detector detects the change of the video signals.

2 Claims, 23 Drawing Sheets

| YHst | 0 | 1 | 2 | 3 | 4 | 5 | 6 | ----- | 15 |
|---|---|---|---|---|---|---|---|---|---|
| CORRECTION VALUE | 0 | 20 | 40 | 60 | 40 | 20 | 0 | 0 | 0 |

IMAGE PROCESSING APPARATUS AND MOBILE TERMINAL APPARATUS

INCORPORATION BY REFERENCE

The present application claims priority from Japanese application JP2005-080846 filed on Mar. 22, 2005, the content of which is hereby incorporated by reference into this application.

TECHNICAL FIELD

This invention relates to an image processing apparatus and a mobile terminal device each capable of inputting images and watching them.

BACKGROUND

A multimedia computer system that converts an input RGB signal to a luminance signal and a color difference signal, extracts a characteristic point of the luminance signal for each frame, corrects the luminance signal and the color difference signal and displays images has been proposed in the past (refer to JP-A-2002-132225, page 4 and FIG. 1, for example).

When this system is applied to a mobile terminal device operated by a battery, consumed power increases as the luminance signal and the color difference signal are corrected for each frame. There is often the case where an operator is away from home and cannot charge the mobile terminal device. When consumed power is great, the usable time of the mobile terminal becomes short and the ease of use or usability of the device is lost. Therefore, the mobile terminal device that can display satisfactory images at low power of consumption has been required. Another problem is that when environmental light is incident into the display, the image becomes difficult to watch and the mobile terminal device cannot be conveniently used outdoors.

Therefore, an image processing apparatus and a mobile terminal device having improved ease of use for users have been required.

SUMMARY OF THE INVENTION

According to one aspect of the invention, there is provided an image processing apparatus including an input portion to which video signals are inputted; an illumination sensor for detecting the intensity of illumination (illumination) or brightness; a correction portion for correcting the video signals inputted to the input portion; and a control portion for executing control so that the correction portion corrects the video signals in accordance with distribution of luminance or hue or saturation of the video signals and with the illumination detected by the illumination sensor when any change occurs in the video signal inputted to the input portion.

According to another aspect of the invention, there is provided an mobile terminal device including an input portion to which video signals are inputted; a detection portion for detecting a change of the video signals in accordance with a mean value of luminance of the video signals inputted to the input portion; a correction portion for correcting the video signals inputted to the input portion; and a control portion for executing control so that the correction portion corrects the video signals in accordance with distribution of luminance or hue or saturation of the video signals when the detection portion detects the change of the video signals.

Other objects, features and advantages of the invention will become apparent from the following description of the embodiments of the invention taken in conjunction with the accompanying drawings.

DESCRIPTION OF THE EMBODIMENTS

Though the invention can be applied to all portable terminal apparatuses such as mobile telephones, PHS, notebook type computers, portable TV, portable video recording/reproduction apparatuses and so forth, the invention will be explained about the mobile telephone by way of example.

Figure 1:
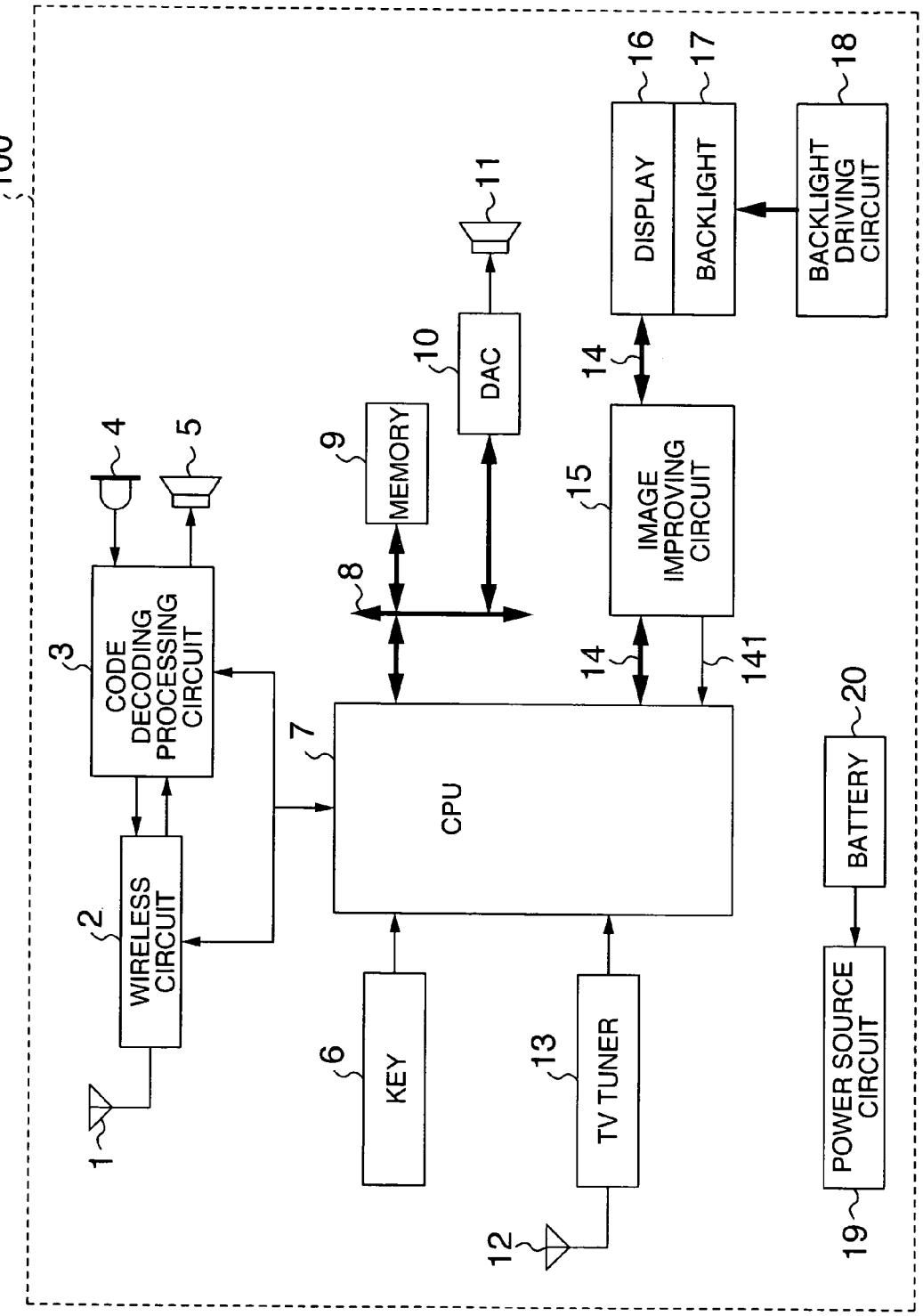
FIG. 1 is a block diagram showing a structural example of a mobile telephone.

FIG. 1 is a block diagram showing a structural example of the mobile telephone. A communication antenna 1 receives a radio wave transmitted in air, converts it to a radio frequency electric signal and inputs the signal to a wireless circuit (radio circuit) 2. The communication antenna 1 also converts the radio frequency electric signal outputted from the wireless circuit 2 and transmits the radio wave. The wireless circuit 2 demodulates the radio frequency electric signal received by the communication antenna 1 in accordance with an instruction of CPU (Central Processing Unit) 7 and inputs the signal to a code decoding processing circuit 3. The output signal of the code decoding processing circuit 3 is modulated, converted to the radio frequency electric signal and outputted to the communication antenna 1. The code decoding processing circuit 3 decodes the output signal of the wireless circuit 2 under control of the CPU 7 and outputs a communication sound signal to a receiver 5 and character data and image data to the CPU 7. The code decoding processing circuit 3 encodes the sound inputted from a microphone 4 or the character and image data edited by a user through the operation of keys 7. In this embodiment, the key is used as an operation portion for instructing and inputting the information but the invention is not limited to the key and may use a sound input portion or an input portion of a touch panel system.

CPU 7 executes processing of the entire mobile telephone. For example, CPU 7 acquires a program from a memory 9 through a CPU bus 8, controls the code decoding processing circuit 3, the wireless circuit 2 and the communication antenna 1 and keeps standby for call-in. memory 9 stores a fixed pattern and a call sound such as melody that are in advance recorded to the mobile telephone, personal information such as a telephone book and an address book, a call melody and image data down-loaded, and so forth. When call is made, CPU 7 reads the name of the dialing party, its call melody and its call-in image from the telephone book of the memory 9, outputs sound data from a speaker 11 through DAC (Digital Analog Converter) 10 and displays the image data on a display 16 through a video I/F (Interface) 14 and an image improving circuit 15 to notify the user of the call. The user can receive and transmit the speech and the mail by operating the keys 6.

A TV antenna 12 converts a TV broadcasting radio wave it receives to a radio frequency electric signal and outputs it to a TV tuner 13. The TV tuner 13 applies a demodulation processing to the input signal to convert it to an electric signal of a CMOS level and outputs the electric signal to CPU 7. CPU 7 initializes the TV tuner 13 and instructs the tuner 13 to select stations. The tuner 13 periodically transmits information representing the reception condition such as a bit error to CPU 7 to satisfy the request from CPU 7.

CPU 7 executes a separation processing of the image and the sound for the signal inputted from the TV tuner 13 and their decoding processing. The image is displayed on the display 16 through the image improving circuit 15 and the sound is reproduced by the speaker 11 through DAC 10. Consequently, the user can listen to TV broadcasting. Incidentally, TV broadcasting to be received may be either analog broadcasting or digital broadcasting. In this embodiment, CPU 7 has an interface capable of directly connecting the output of the TV tuner 13 but this circuit construction is not restrictive and a circuit for interface conversion may be used, too. The interface conversion circuit may be mounted to CPU or may be mounted in a stack form. When the mobile telephone has an image processor such as an application processor or co-processor mounted thereto, the interface conversion circuit may be mounted to the same silicon chip as the processor or may be mounted in the stack form on other silicon chip. The interface conversion circuit may further be mounted inside a controller of the display, the driver IC or the TV tuner 13. Dedicated terminals may be provided to CPU 7 for the connection of the interface conversion circuit and CPU 7, or may be connected to the CPU bus 8.

A battery 20 is a rechargeable secondary cell such as lithium ion or nickel hydrogen cell and supplies power for operating each component constituting the mobile telephone. A power source (supply) circuit 19 supplies a voltage to each constituent of the mobile telephone on the basis of power supplied from the battery 20. When the remaining power of the battery 20 becomes small, the battery 20 is charged by power from a home plug socket or a car battery. Incidentally, the wiring relation of each component of the mobile telephone and the power source circuit 19 is omitted in FIG. 1.

The image improving circuit 15 applies an image improving processing to the video signal outputted from CPU 7 and outputs the signal to the display 16. Backlight 17 generates illumination light of the display 16 from power supplied from a backlight driving circuit 18 and illuminates the display 6. A cold cathode-ray tube, a white LED or a three-color LED of red, green and blue is used as the light source of the backlight 17. To drive the backlight 17, the backlight driving circuit 18 boosts or lowers the voltage supplied from the battery 20. The backlight driving circuit 18 can adjust illumination and the colors under control of CPU 7. The backlight driving circuit 18 may have an independent construction as shown in FIG. 1 or may be a part of the power source circuit 19. When the power source circuit 19 has an LSI configuration, for example, the backlight driving circuit 18 may be mound to the same silicon chip in a hybrid construction or may be mounted in the stack form to other silicon chip.

Figure 2:
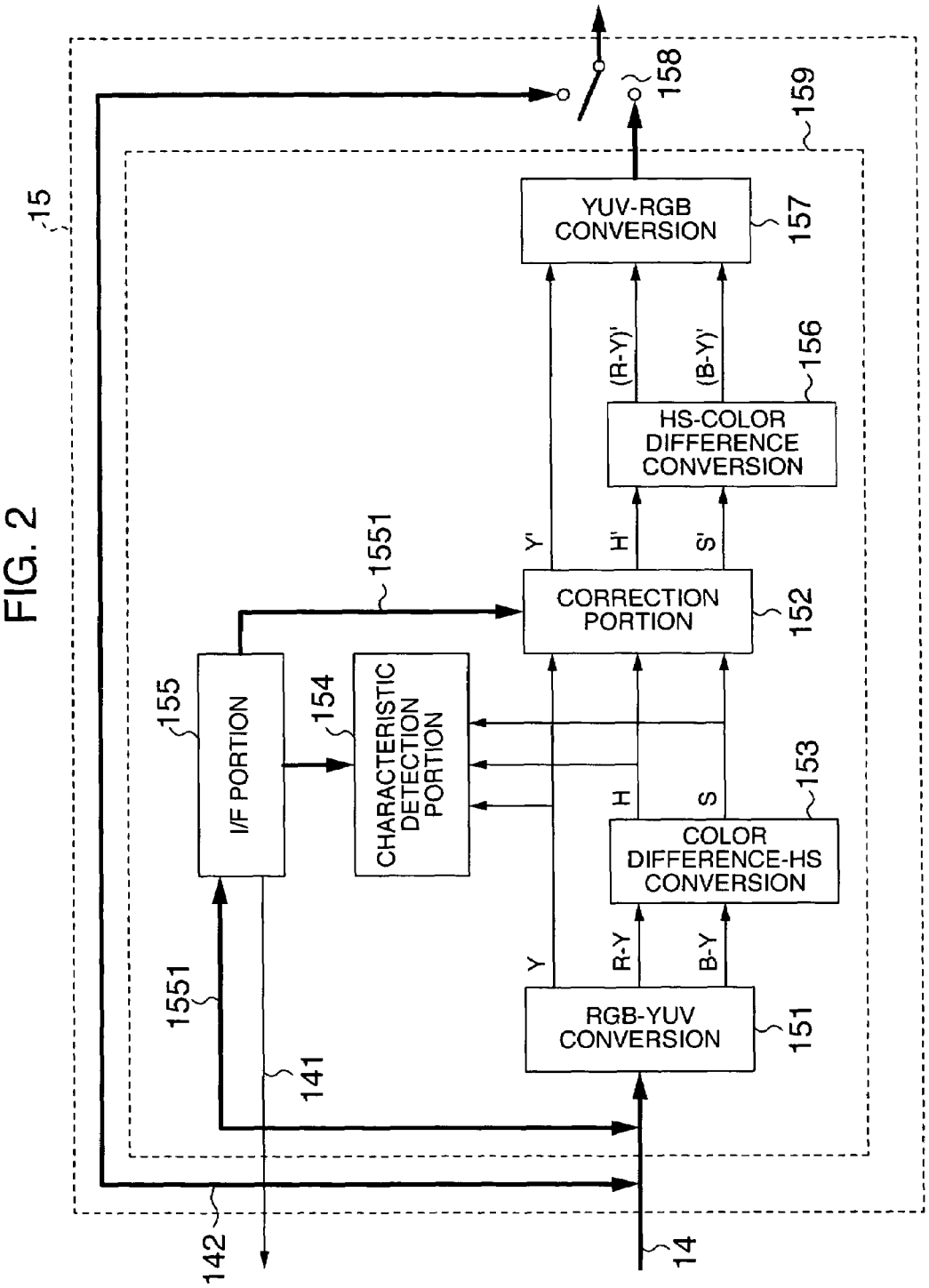
FIG. 2 is a block diagram showing a structural example of an image improving circuit.

FIG. 2 is a block diagram showing a structural example of the image improving circuit 15. An RGB-YUV conversion portion 151 converts the video signal of the RGB form inputted from CPU 7 through a video I/F 14 to luminance signals and color difference signals and outputs the luminance signal as Y and the color difference signals as R−Y and B−Y.

Conversion of the video signal of the RGB system to the YUV signals can be made in accordance with the following formulas:

$$Y = 0.290 \times R + 0.5870 \times G + 0.1140 \times B \quad (1)$$

$$Cb = (-0.1687) \times R + (-0.3313) \times G + 0.5000 \times B \quad (2)$$

$$Cr = 0.5000 \times R + (-0.4187) \times G + (-0.0813) \times B \quad (3)$$

A color difference-HS conversion portion 153 applies hue and saturation conversion to the color difference signals R−Y and B−Y inputted from the RGB-YUV conversion portion 151 and outputs hue H and saturation S. A characteristic detection portion (detector) 154 calculates characteristic point data such as a minimum level, a mean level, a maximum level, histogram, etc, of the inputted video signal from the RGB-YUV conversion portion 151 and hue H and saturations S inputted from the color difference-HS conversion portion 153 and writes the data into an I/F portion 155. The I/F portion 155 generates at a predetermined timing an interrupt signal 141 to CPU 7. Detecting the interrupt signal 141, CPU 7 reads the characteristic point data stored in the I/F portion 155 through an internal bus 1551, decides correction data in accordance with a predetermined algorithm and writes the correction data into the I/F portion 155 through the internal bus 1551. A correction portion (corrector) 152 corrects the luminance signal Y, hue H and saturation S inputted in accordance with the correction data written from CPU 7 to the I/F portion 155 and outputs them as luminance Y', hue H' and saturation S'. The HS-color difference conversion portion 156 converts the inputted hue signal H' and saturation signals S' to the color difference signal (R−Y)' and (B−Y)', respectively, and outputs them. A YUV-RGB conversion portion 157 converts the inputted luminance Y' and the color difference signals (R−Y)' and (B−Y)' into the RGB form and outputs them. The YUV-RGB conversion described above can be executed in accordance with the following formula:

$$R = Y + 1.402V \quad (4)$$

$$G = Y + (-0.34414) \times U + (-0.71414) \times V \quad (5)$$

$$B = Y + 1.772 \times U \quad (6)$$

A selector 158 selects the output of the YUV-RGB conversion portion 157 or the through signal 142 of the video I/F 142 and outputs it to the display 16. Control of the selector 158 may be made from CPU 7. Alternatively, when the remaining quantity of the battery falls below a predetermined value or in the case of an open/closing type mobile telephone, the selector 158 may be switched in the interlocking arrangement with the opening/closing operation. In the case of the interlocking operation with the opening/closing operation or in the case of a foldable type, the YUV-GB conversion portion 157 is preferably selected when the telephone is opened. Even in the cases of a slide type, rotation type, a foldable type and a two-axis hinge type having a second shaft in a direction for rotating a display by 180° besides a rotary shaft in the folding direction, the YUV-RGB conversion portion 157 may be selected by a selector 158 when the display can be watched under the close state. The YUV-RB conversion portion 157 may be selected in accordance with the content to be displayed during watching of TV, still image and animation. The through signal 142 may be selected under the standby state irrespective of the shape of the mobile telephone and its open/close state.

When text data such as a mail text or a caption is inputted, the processing such as RGB-YUV conversion in the image improving circuit 15 is not necessary. Therefore, CPU 7 executes control to select the through signal 142. In this case, the operation of the portion encompassed by dotted line 159 is stopped. Consequently, low power consumption can be achieved. More concretely, the supply of the operation clock to the image improving circuit 15 is stopped and the supply of power to the blocks inside the dotted line 159 is stopped. Incidentally, when the supply of power is stopped, the output of the power source circuit 19 is stopped or the supply of power may be stopped by disposing a switch for cutting off a power source suction path on the side of the image improving circuit 15.

Figure 3:
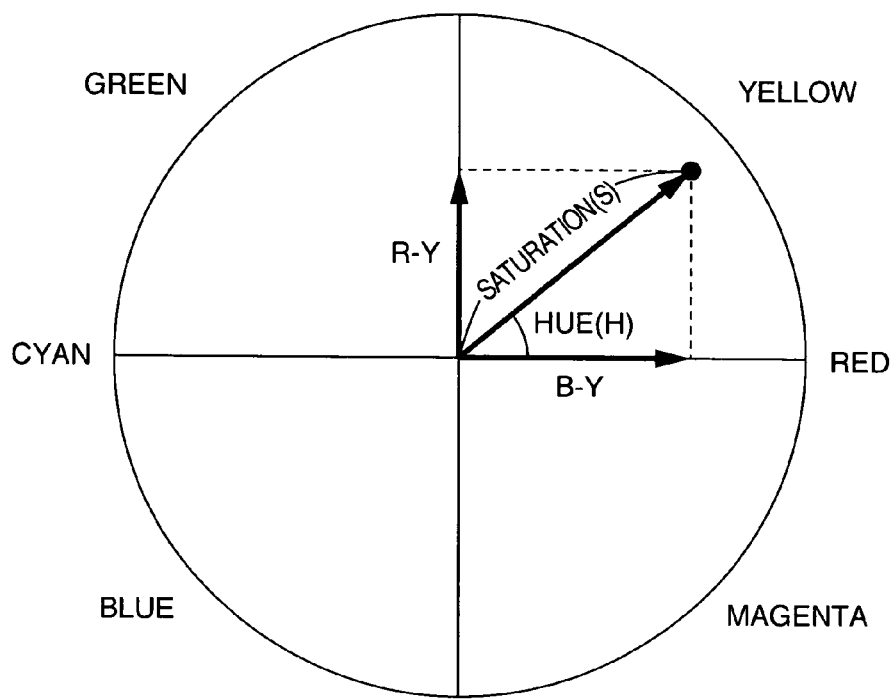
FIG. 3 is a characteristic view useful for explaining the relation between a color difference and saturation.

Next, the outline of the operation of the color difference-HS conversion portion 153 will be explained with reference to the drawings. FIG. 3 is a diagram for explaining the relation between hue (H) and saturation (S). The abscissa represents the level of the B−Y signal and the ordinate does the level of the R−Y signal. A vector sum of the B−Y signal and the R−Y signal is a vector representing hue/saturation, an angle is hue H and magnitude is saturation S. Therefore, hue H can be determined by formula (7) and saturation S, by formula (8):

$$H = \tan^{-1}((R-Y)/(B-Y)) \quad (7)$$

$$S = SQR((R-Y)^2 + (B-Y)^2) \quad (8)$$

Figure 4:
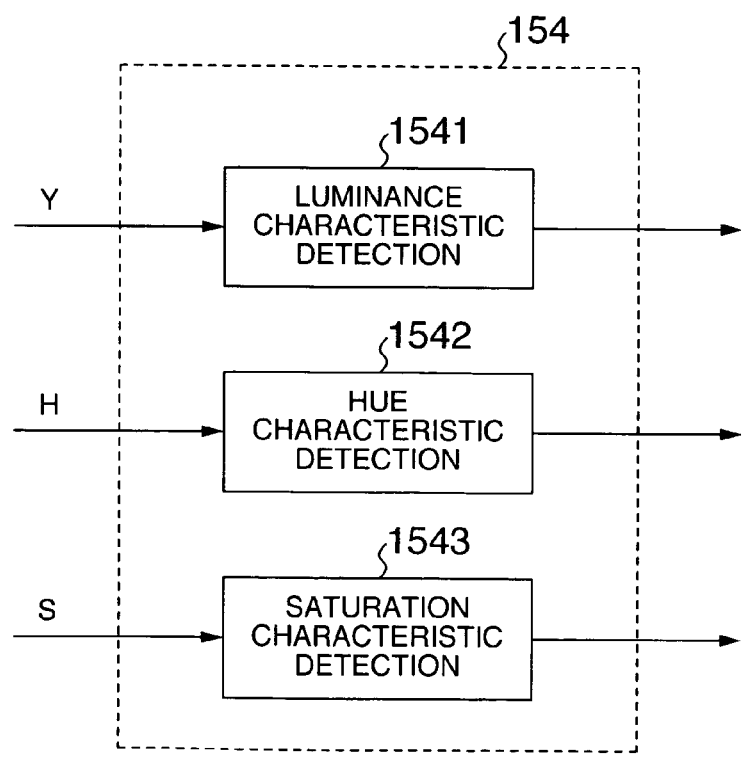
FIG. 4 is a block diagram showing a structural example of a characteristic detection circuit.
Figure 5:
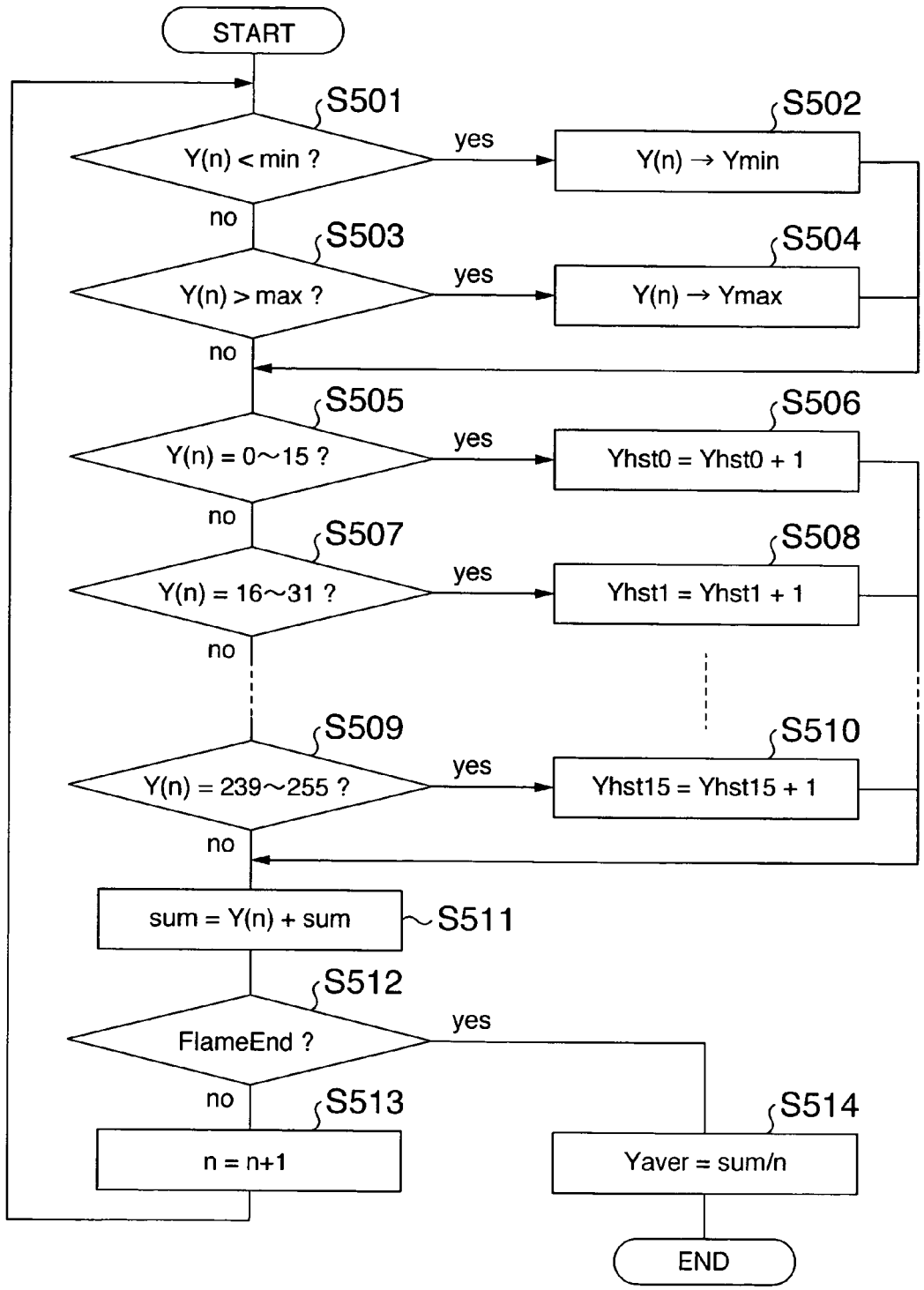
FIG. 5 is a flowchart showing an example of a detection processing of a luminance characteristic detection circuit.

The characteristic detection portion 154 is constituted by a luminance characteristic detection portion 1541, a hue characteristic detection portion 1542 and a saturation characteristic detection portion 1543 as shown in FIG. 4. FIG. 5 is a flowchart showing an example of the detection processing of the luminance characteristic detection portion 1541. As represented by the flowchart, the luminance characteristic detection portion 1541 judges the level of the luminance signal that is momentarily inputted, and acquires characteristic data such as a maximum level, a minimum level, a level frequency for each area and a mean level. In FIG. 5, a detection processing for dividing an input tone into tone areas of 16 stages when the input tone of the luminance level is from 0 to 255 will be explained but the detection processing is not particularly limited thereto. For example, the tone area can be freely set to 8 stages or 32 stages within a range in which a resource such as a memory and a gate capacity is available. Incidentally, the detection processing program executed by the luminance characteristic detection portion 1541 may be stored in the memory 9 or in a memory provided to the luminance characteristic detection portion 1541.

First of all, whether or not the luminance level Y(n) of the nth pixel is smaller than the minimum level Ymin stored in the memory 9 is compared (S501). Incidentally, 255 and 0 are stored as the initial values of the minimum level Ymin and the maximum level Ymax in the memory 9, respectively. When the luminance level is smaller than the present minimum level, the luminance level of the nth pixel is stored as the minimum level in the memory 9 (S502). When the luminance level is greater than the minimum level, whether or not the luminance level of the nth pixel is greater than the maximum level is compared (S503). When the luminance level is greater than the maximum level, the luminance level of the nth pixel is used as the maximum value (S504). When the luminance level is smaller than the maximum value, whether or not the luminance level of the nth pixel is within 0 to 15 is judged (S505). When the luminance level is from 0 to 15, 1 is added to the value of Yhst0 (S606). Yhst0 represents the number of the luminance levels contained within the tone areas of 0 to 15.

When the luminance level is not from 0 to 15, whether or not the luminance level is within 16 to 31 is judged (S507). When the result is Yes, 1 is added to the value of Yhst1 (S508). When the result is No, judgment is made one after another as to whether or not the luminance level is contained in other tone areas.

When area assortment of the luminance level is completed, the luminance level of the nth pixel is added to the present total luminance level (S511). In Step S512, whether or not the processing for one frame is completed is judged. When the result is Yes, the total luminance level is divided by the number of pixels n to calculate a mean luminance level and to complete the processing (S514). When the result is No, 1 is added to n, the flow returns to Step S501 and the processing of the luminance level of the next pixel is executed.

Figure 6:
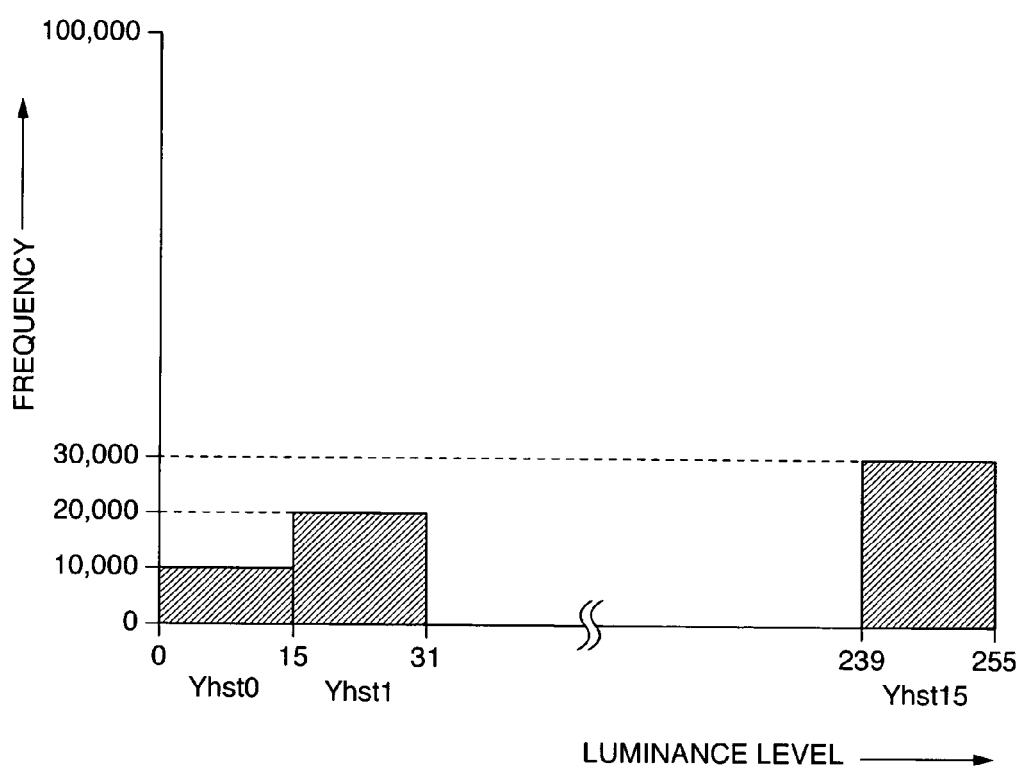
FIG. 6 shows an example of a luminance histogram.

FIG. 6 shows an example of a luminance histogram. The abscissa represents the areas of the luminance histogram and the ordinate represents a frequency. When this histogram is acquired, the feature of luminance can be easily grasped. For example, it is possible to judge whether or not the screen is merely a dark screen or is a screen in which bright portions such as the moon and stars exist inside the dark screen.

Figure 7:
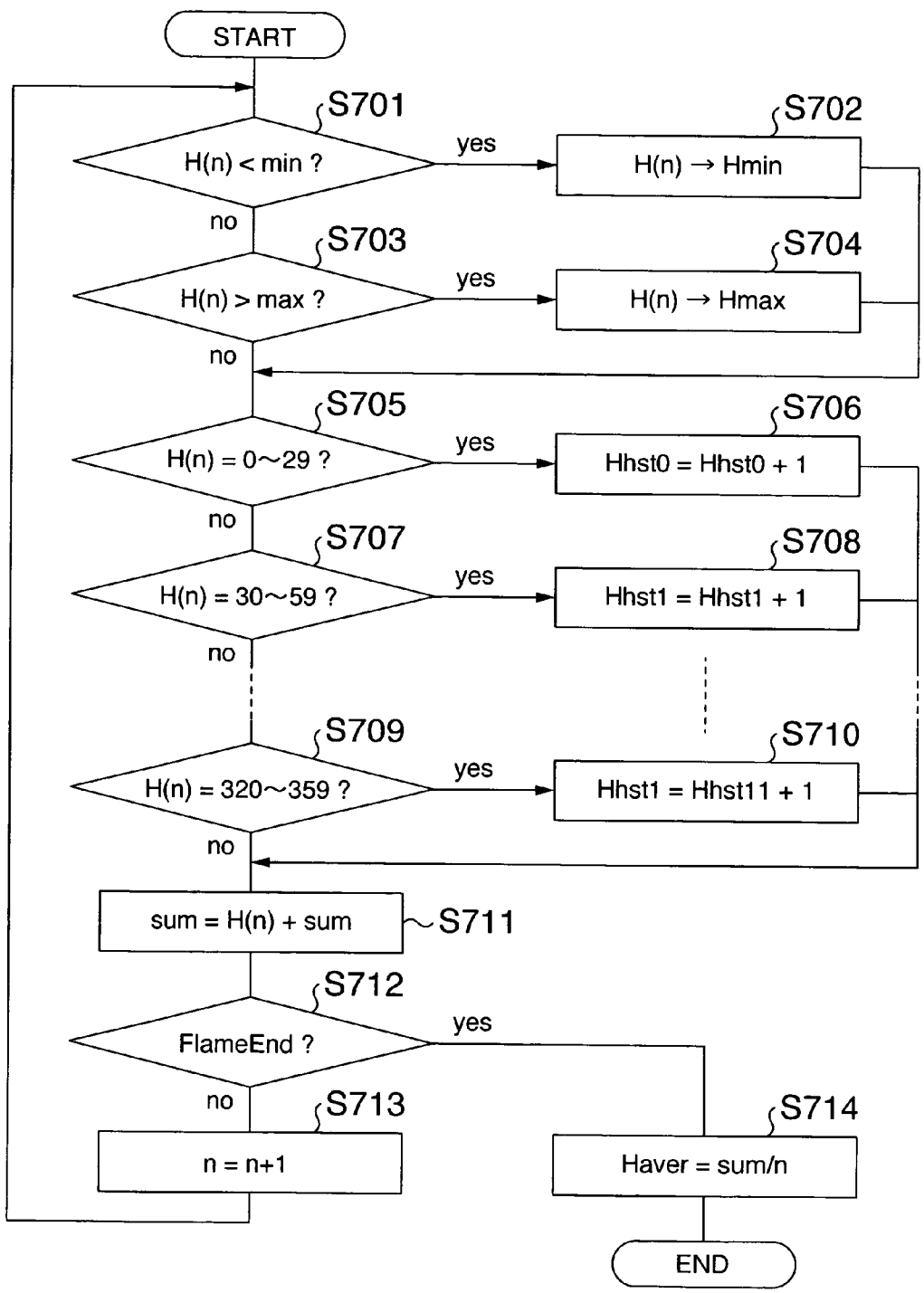
FIG. 7 is a flowchart showing an example of a detection processing of a hue characteristic detection circuit.

FIG. 7 is a flowchart showing an example of the detection processing of the hue characteristic detection portion 1542. As represented by the flowchart, the hue characteristic detection portion 1542 executes level judgment of the hue signals H that are momentarily inputted in the frame unit, and acquires the maximum level, the minimum level, the frequency of the level for each area and the mean level. In FIG. 7, an example of the processing where the range of the hue level is from 0 to 359 and this level is divided into the hue areas of 12 stages. However, the detection processing is not limited to this processing example. Incidentally, the detection processing program executed may be stored in memory 9 or in the memory provided to the hue characteristic detection portion 1542 in the same way as the luminance characteristic detection.

In Steps S701 to S710, in which hue area Hhst0 to Hhst11 the nth hue level H(n) is contained is detected in the same way as the luminance level. When the area of the hue level is judged, the hue level of the nth pixel is added to the present total hue level (S711) and whether or not the processing for one frame is completed is judged (S712). The mean hue level is calculated and the processing is completed (S714) when the processing is completed (Yes). When the processing is not completed (No), 1 is added to n (S713) and the flow returns to S701 to execute the processing of the hue level of the next pixel.

Figure 8:
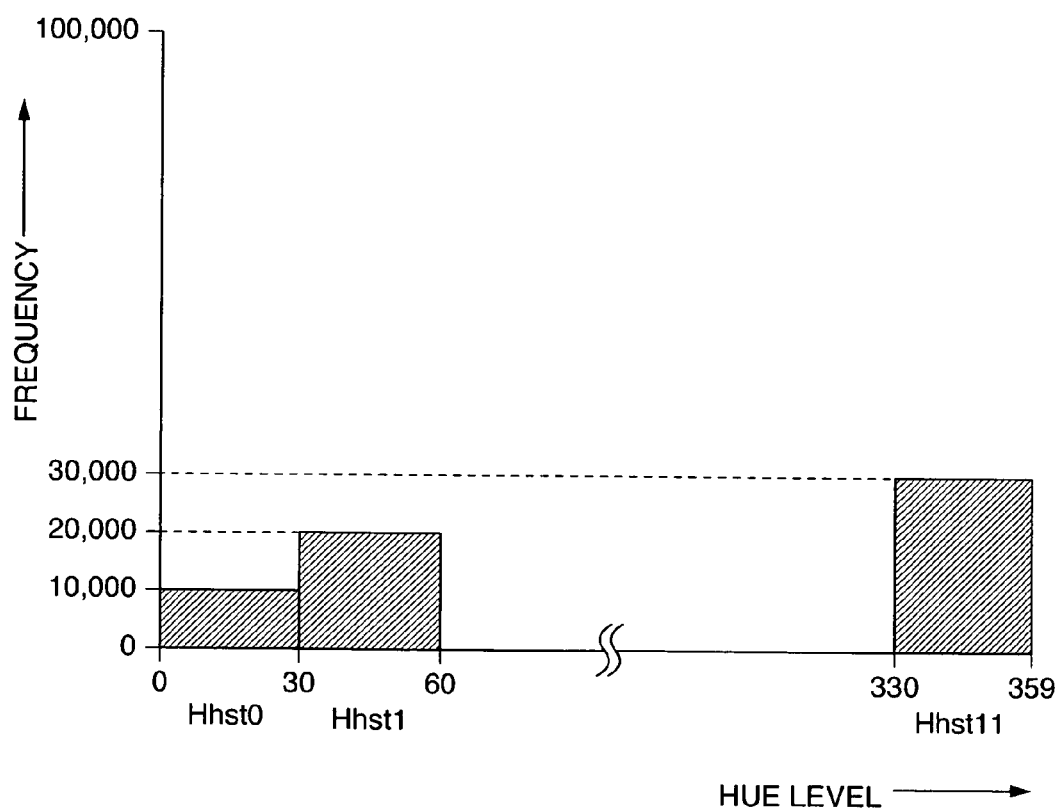
FIG. 8 shows an example of a hue histogram.
Figure 9:
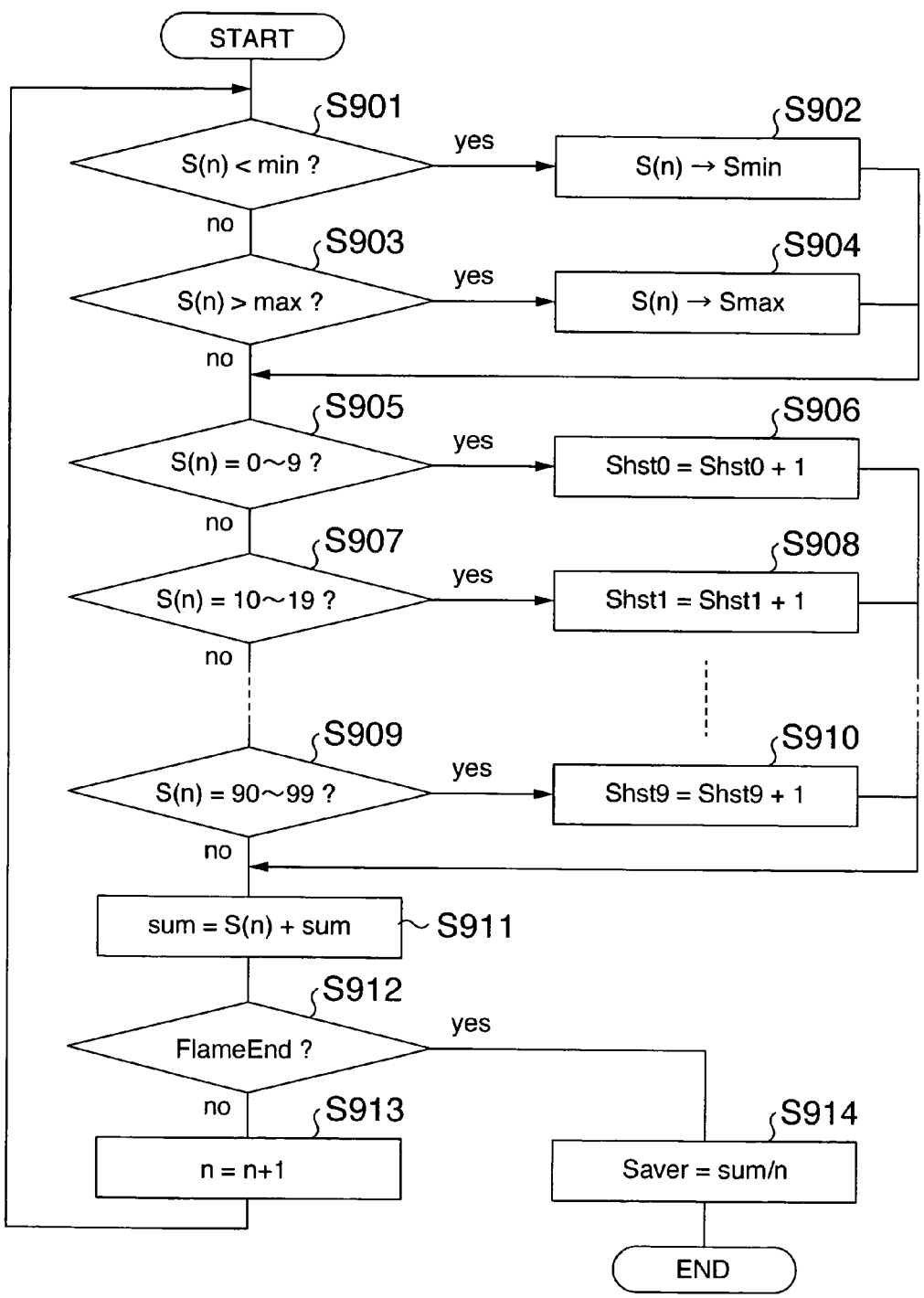
FIG. 9 is a flowchart showing an example of a detection processing of a saturation characteristic detection circuit.

FIG. 8 shows an example of the hue histogram created by using the area frequency detected in the manner described above. The abscissa represents the areas of the hue histogram and the ordinate does the frequency. The change of the characteristics of the hue can be easily grasped by creating the histogram. FIG. 9 is a flowchart showing an example of the detection processing of the saturation characteristic detection portion 1543. The saturation characteristic detection portion 1543 judges the level of the saturation signal S that is momentarily inputted in the frame unit, and acquires the maximum level, the minimum level, the frequency of the level for each area and the mean level. In FIG. 9, an example of the processing where the range of the saturation level is from 0 to 99 and this level is divided into the areas of 10 stages will be explained. However, the detection processing is not limited to this processing example. Incidentally, the detection processing program executed may be stored in memory 9 or in the memory provided to the saturation characteristic detection portion 1543 in the same way as the luminance characteristic detection.

In Steps S901 to S910, in which saturation areas Shst0 to Shst9 the nth saturation level S(n) is contained is detected in the same way as the luminance level. When the area of the saturation level is judged, the saturation level of the nth pixel is added to the present total saturation level (S911) and whether or not the processing for one frame is completed is judged (S912). The mean saturation level is calculated and the processing is completed (S914) when the processing is completed (Yes). When the processing is not completed (No), 1 is added to n (S913) and the flow returns to S901 to execute the processing of the saturation level of the next pixel.

Figure 10:
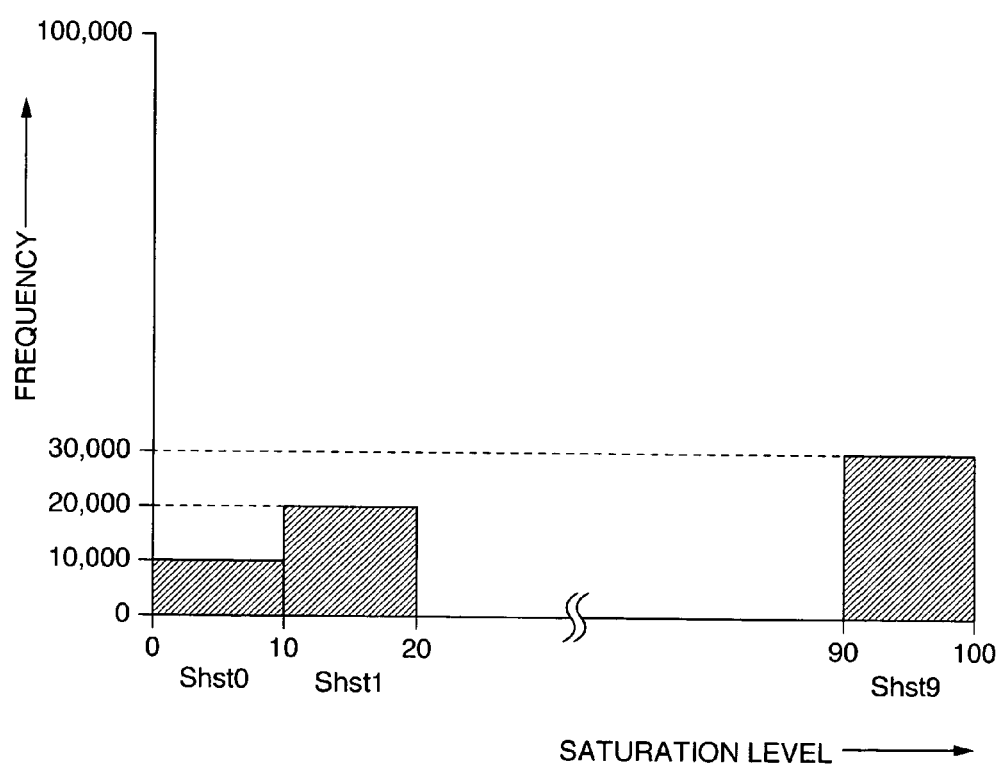
FIG. 10 shows an example of a saturation histogram.

FIG. 10 shows an example of the saturation histogram. The abscissa represents the areas of the saturation histogram and the ordinate does the frequency. The change of saturation of the inputted video signal can be detected by acquiring this saturation histogram.

Figure 11:
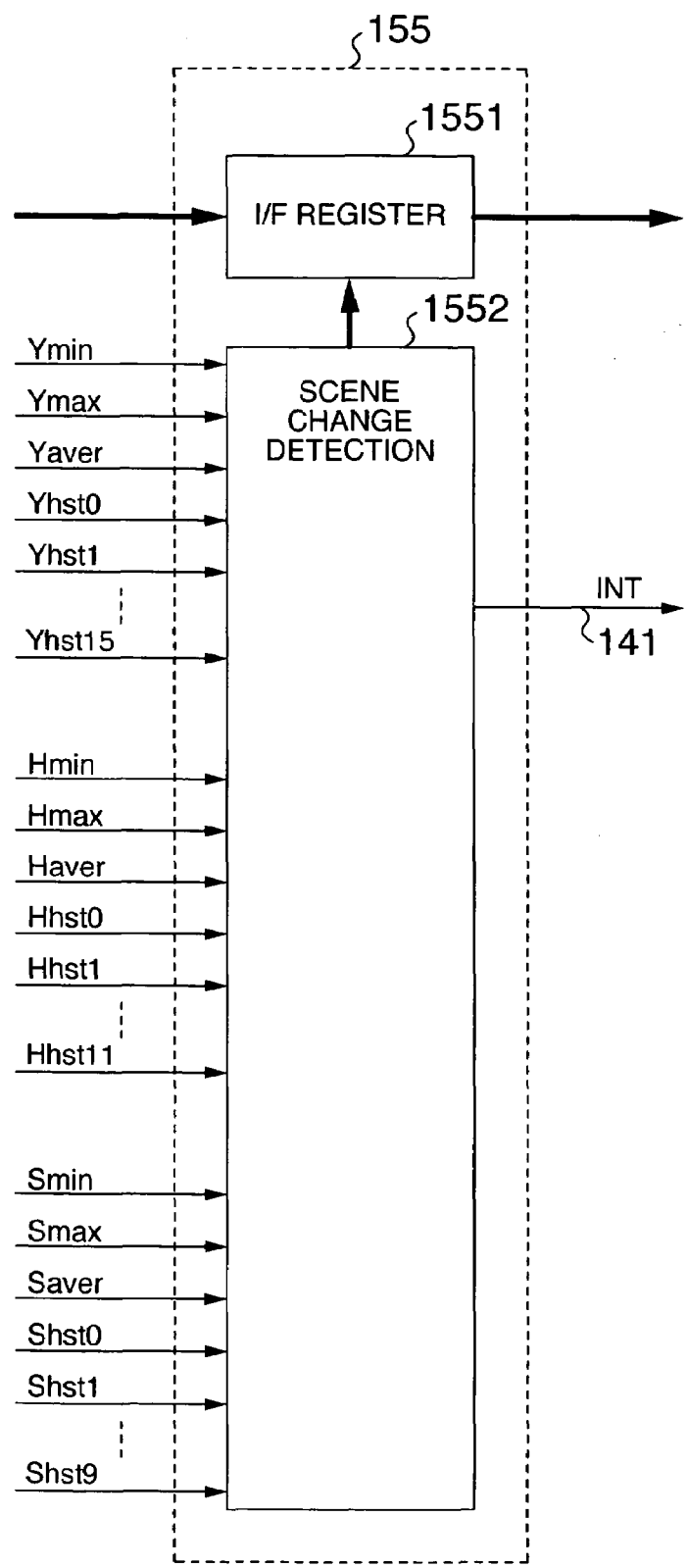
FIG. 11 is a block diagram showing a structural example of an I/F portion.

FIG. 11 is a block diagram showing an example of the internal construction of the I/F portion 155. Signals are written and read between CPU 7 and the image improving circuit 15 through an I/F register portion 1551. When the characteristic data such as the luminance level, hue and saturation are inputted from the characteristic detection portion 154, a scene change detection portion 1552 stores these data. When new data is inputted, the scene change detection portion 1552 rewrites the data and judges the difference of the new and old data. The scene change detection portion 1552 judges that a scene change occurs when the difference exists, and generates INT 141 for CPU 7. CPU 7 reads out the new characteristic data from the I/F register 1551, generates new correction data and updates the correction data of the I/F register 1551. In this example, CPU 7 reads out the characteristic data from the I/F register 1551 but the I/F register 1551 may transmit the data to CPU 7. Incidentally, the term "scene change" includes the change of a program to CM (commercial message), the change of a daytime scene to a night scene inside a program, the change of an imaging position, the change of a studio image to an on-site image and switching of TV cameras inside a studio or stadium.

Figure 12:
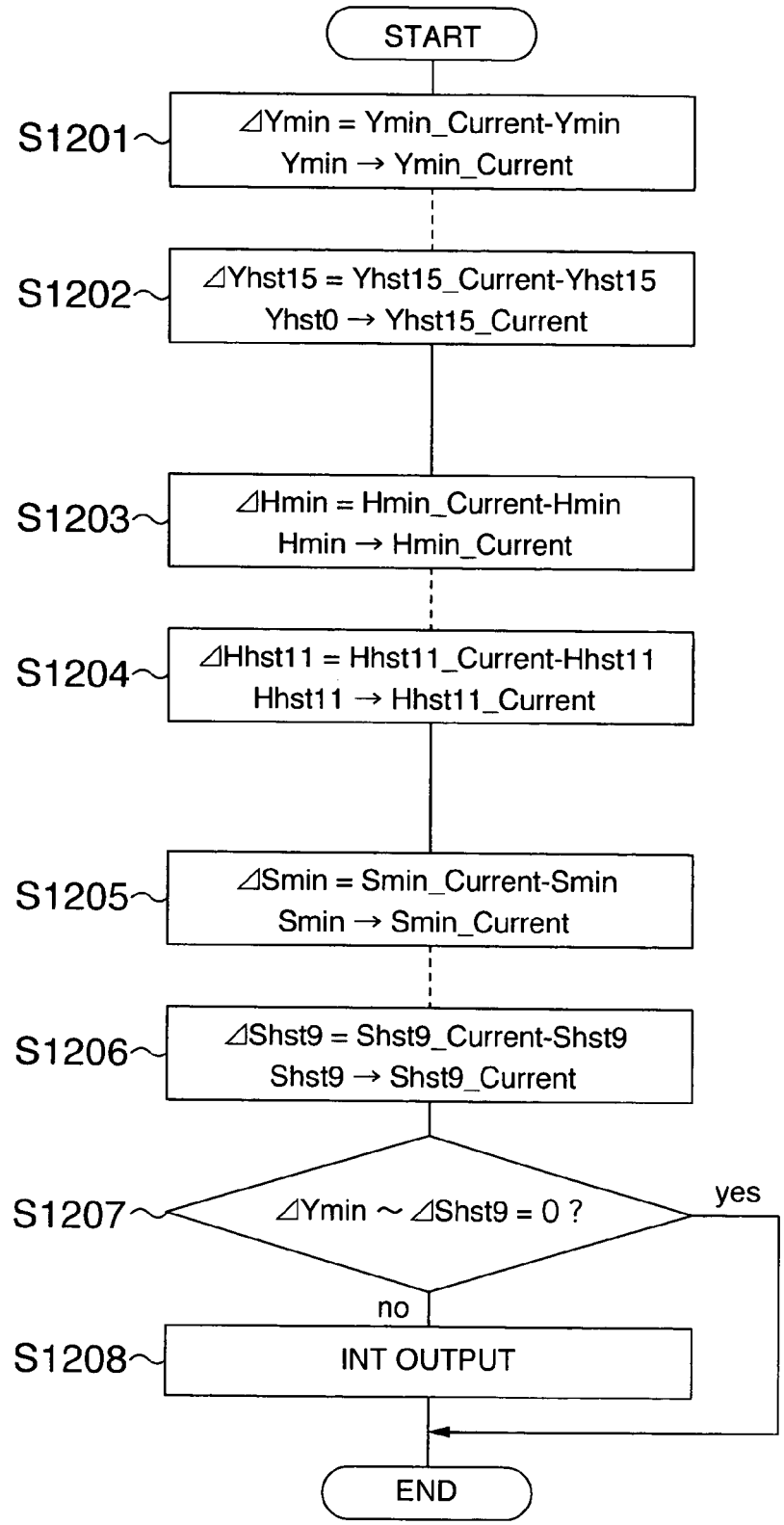
FIG. 12 is a flowchart showing an example of a detection processing of a scene change characteristic detection circuit.

FIG. 12 is a flowchart showing an example of the detection processing of the scene change detection portion 1552. In Step S1201, a difference of new and old minimum luminance levels is determined and the new data is written into the I/F register 1551. The difference is similarly determined for each of the maximum luminance level, the mean luminance level and the frequency for each area. After the difference of the frequency of the area 15 is determined (S1202), the flow proceeds to the processing of the hue characteristics. As for the hue, the differences of the minimum hue level, the maximum hue level, the mean hue level and the frequency are determined in Steps S1203 to S1204 in the same way as luminance (S1205 to S1206). Whether or not the difference of the characteristics of luminance, hue and saturation is "0", that is, whether or not they are the same as those of a preceding frame is judged (S1207). When the difference does not exist, updating of the correction data is judged as unnecessary and the processing is completed.

When the difference exists (No), on the other hand, the scene change is judged as occurring and the interrupt request 141 is outputted to CPU 7 (S1208). The processing is then completed.

As explained above, as the scene change detection portion 1552 operates, read of the characteristic data and generation of the correction data by CPU 7 and the write processing to the I/F register 1551 can be omitted when the scene is the same as the pattern of the preceding frame. Therefore, the processing load of CPU 7 can be reduced and a consumed current for the data transfer can be reduced, too.

Though FIG. 12 shows the example where the differences of all of luminance, hue and saturation are detected but this is not restrictive. The characteristics of all of the minimum value, the maximum value, and so forth, need not always be detected. To reduce the processing load of CPU 7, it is most effective to detect the scene change on the basis of the difference of the mean level of the luminance signal that most greatly affects the visual feeling of the users. Combination of each characteristic data such as the minimum value of luminance and the mean value of hue may be used for judgment when both minimum and maximum values of luminance change, for example. The scene change may be judged as occurring when the distribution area (abscissa) of the histogram changes.

In the example shown in FIG. 12, the scene change is judged as being absent when the difference of the characteristic data is 0 but the scene change may be judged by setting a certain threshold value and when this value is exceeded. This threshold value is preferably set individually to each characteristic data. To prevent updating of the correction data owing to the existence/absence of the insert title, it is also possible to neglect specific tone area and frequency area so that scene change is not judged even when the frequency of the histogram on the white side changes, for example. The scene change detection portion 1552 may judge the scene change every predetermined time or frame number and may output INT 141 in addition to the case where the scene change is detected by using the luminance level, etc.

The correction portion 152 corrects luminance, hue and saturation on the basis of the correction data generated by CPU 7. The correction method will be hereinafter explained.

Figure 13:
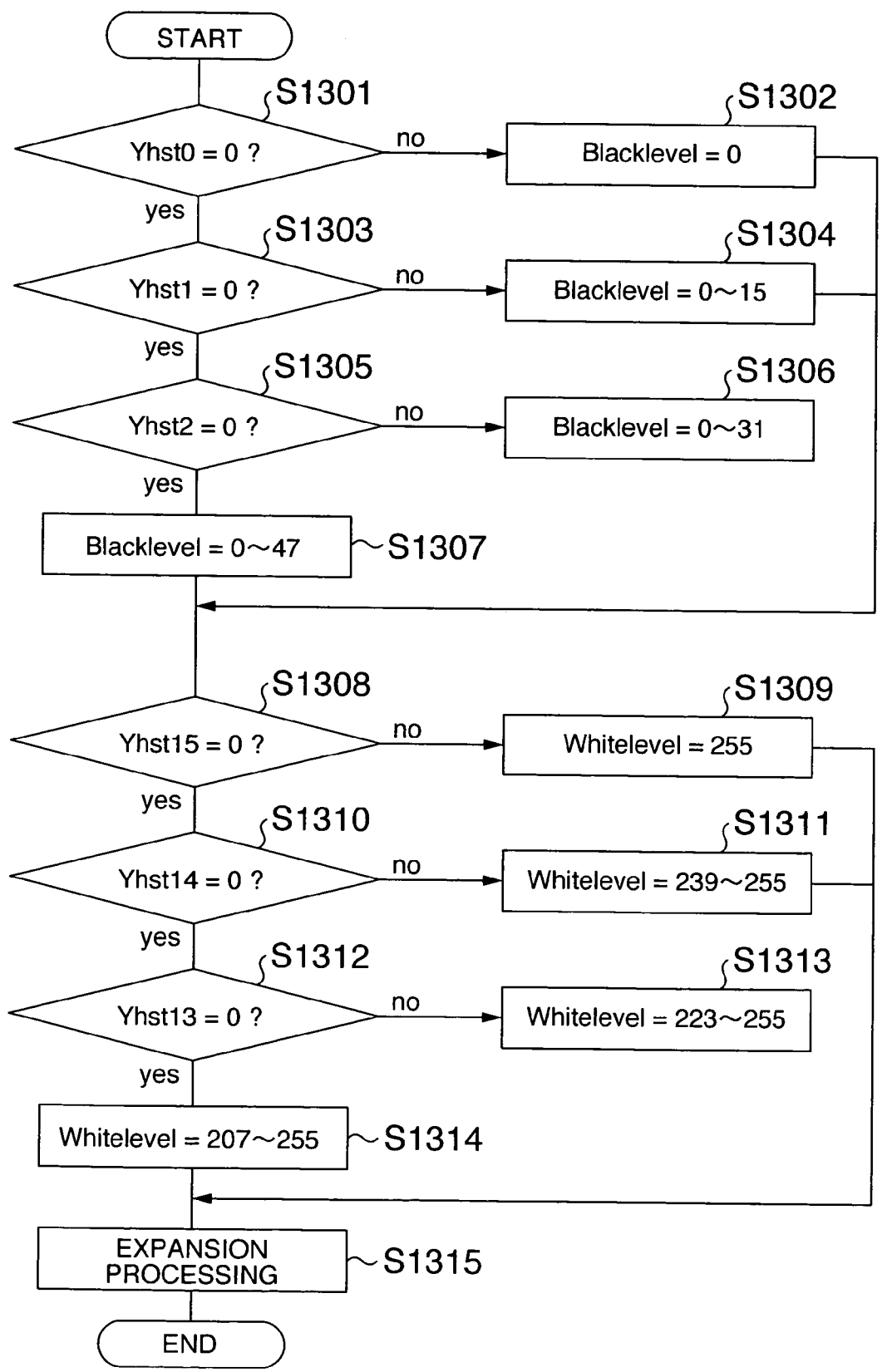
FIG. 13 shows a processing flow example of luminance correction in a correction portion.

FIG. 13 shows an example of the processing flow when the correction portion 152 corrects the luminance signal. First, whether or not a first tone area (Yhst0) of the luminance histogram is 0 is judged (S1301). When the result is No, the "Blacklevel" is set to 0 (S1302). Here, Blacklevel represents the range of the input tone for fixing the output tone to 0 and setting of Blacklevel to 0 means the state where the range in which the output tone is set to 0 does not exist. When the result is Yes, whether or not the second tone area (Yhst1) of the luminance histogram is 0 is judged (S1303). When the result is No, Blacklevel is set to 0 to 15 (S1304). When Yes, whether or not a third tone area (Yhst2) of the luminance histogram is 0 is judged (S1305). When the result is No, Blacklevel is set to 0 to 31 (S1306). When the result is Yes, Blacklevel is set to 0 to 47 without judging the shift to a fourth tone area (Yhst3). When such a limit value is disposed, it is possible to prevent luminance from being excessively corrected.

Next, whether or not the sixteenth tone area (Yhst15) of the luminance histogram is 0 is judged (S1308). When the result is No, "Whitelevel" is set to 255 (S1309). The term "Whitelevel" represents the range of the input tone for fixing the output tone to 255 and setting of Whitelevel to 255 means the state where the range in which the output tone is set to 255 does not exist. When the result is Yes, whether or not the fifteenth tone area (Yhst14) of the luminance histogram is 0 is judged (S1310). When the result is No, Whitelevel is set to 239 to 255 (S1311). When the result is Yes, whether or not the fourteenth area (Yhst13) of the luminance histogram is 0 is judged (S1312). When the result is No, Whitelevel is set to 223 to 255 (S1313). When the result is Yes, judgment of the thirteenth tone area (Yhst12) of the luminance histogram is not made and Whitelevel is set to 207 to 255 (S1314). Excessive correction can thus be prevented by disposing the limit value on the white side.

When the range in which the output tone is fixed to 0 or 255 is decided, an expansion processing is executed (S1501) so that the tones of 0 to 255 that can be outputted to the input tones other than the tone component (crushed component) fixed to the tones of the black and white sides to 0 or 255 can be used. In this way, correction can be made in such a fashion as to increase the gradient (Ygain) of the output tone with respect to the input tone.

An example of the correction method of the luminance signal by the correction portion 152 will be explained with reference to FIGS. 14 to 16.

Figure 14A:
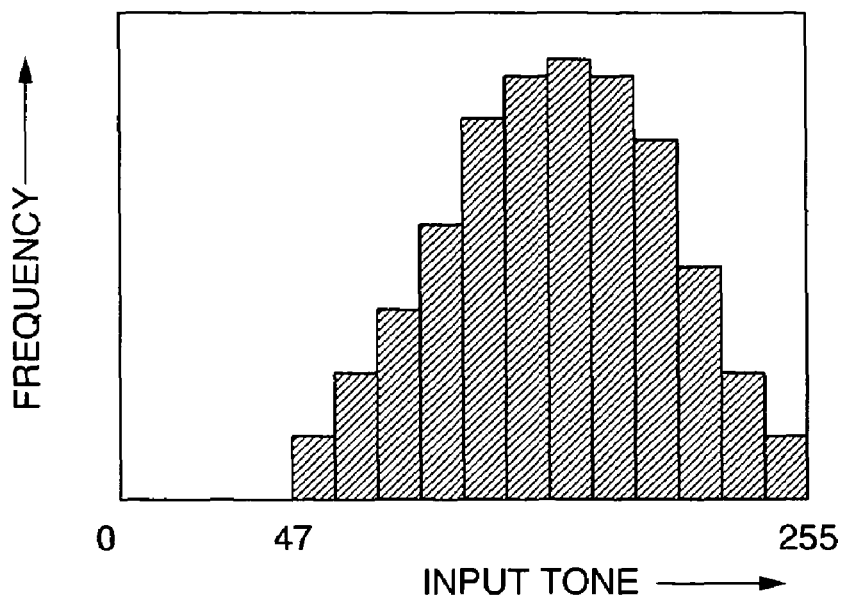
FIGS. 14A and 14B show an example of a luminance histogram and correction characteristics.

FIG. 14A shows the luminance histogram. In this example, the tones from 0 to 47 (Yhst0 to 2) on the black side do not exist. In other words, the drawing shows the example where a video signal having small black portions and whitey (with the black level somewhat floating) is inputted. When the example is applied to the processing flow shown in FIG. 13, Blacklevel=0 to 47 and White level=255, and when the expansion processing is executed, correction is made to the gradient Ygain=1.22. A corrected relation of the output tone with respect to the input tone is called "correction characteristic".

Figure 14B:
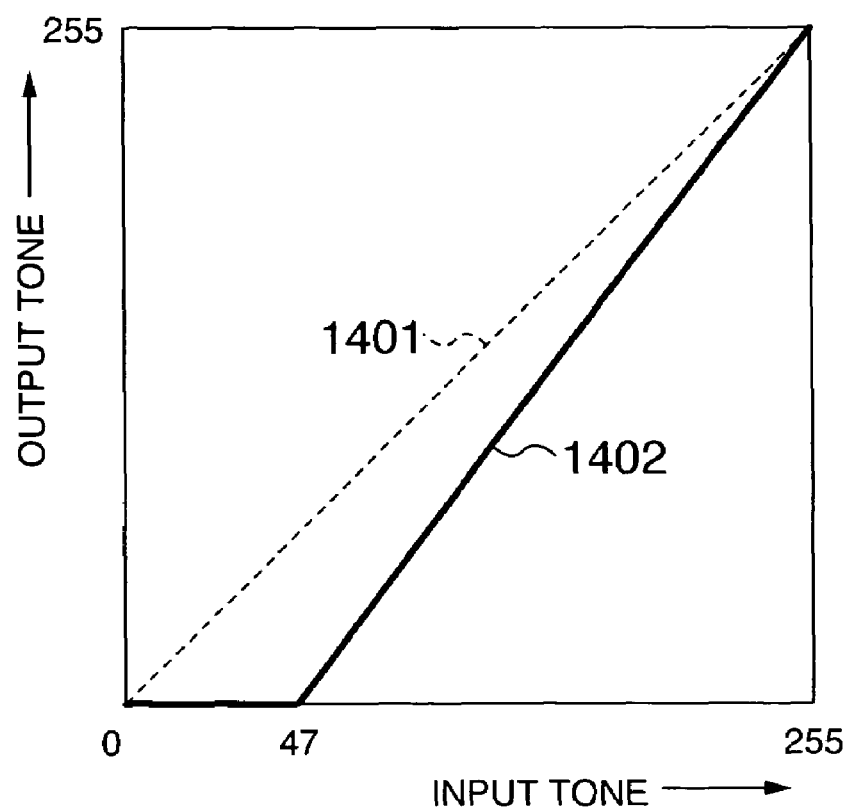

FIG. 14B shows a correction image by this correction characteristic. Dotted line 1401 represents the characteristic of the output tone with respect to the input tone when correction is not made. Solid line 1402 shows the case where correction is made. The gradient of the output tone with respect to the input tones 47 to 255 is great as 0 to 47 at which the tone of the input video signal does not exist are fixed to 0. Consequently, the contrast of the output tone with respect to the input tones can be increased and an image that can be more easily watched can be displayed.

FIG. 15 shows a correction example when a video signal not having tone on the white side is inputted.

Figure 15A:
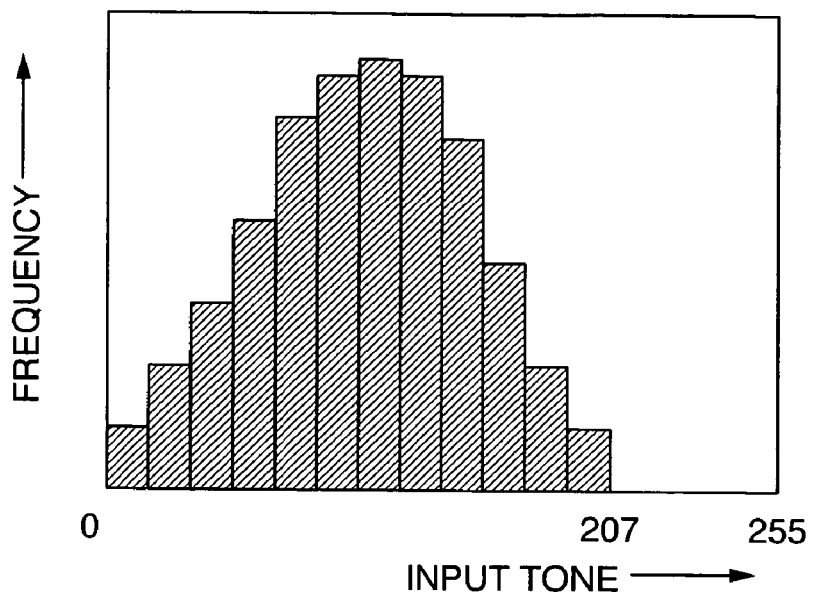
FIGS. 15A and 15B show an example of the luminance histogram and the correction characteristics.

FIG. 15A shows a luminance histogram of the inputted video signal. In this example, the tones from 207 to 255 (Yhst13 to 15) on the white side do not exist. In other words, the drawing shows the example where a blackish video signal is inputted. When the example is applied to the processing flow shown in FIG. 13, Blacklevel=0, Whitelevel=207 to 255 and Ygain=1.22.

Figure 15B:
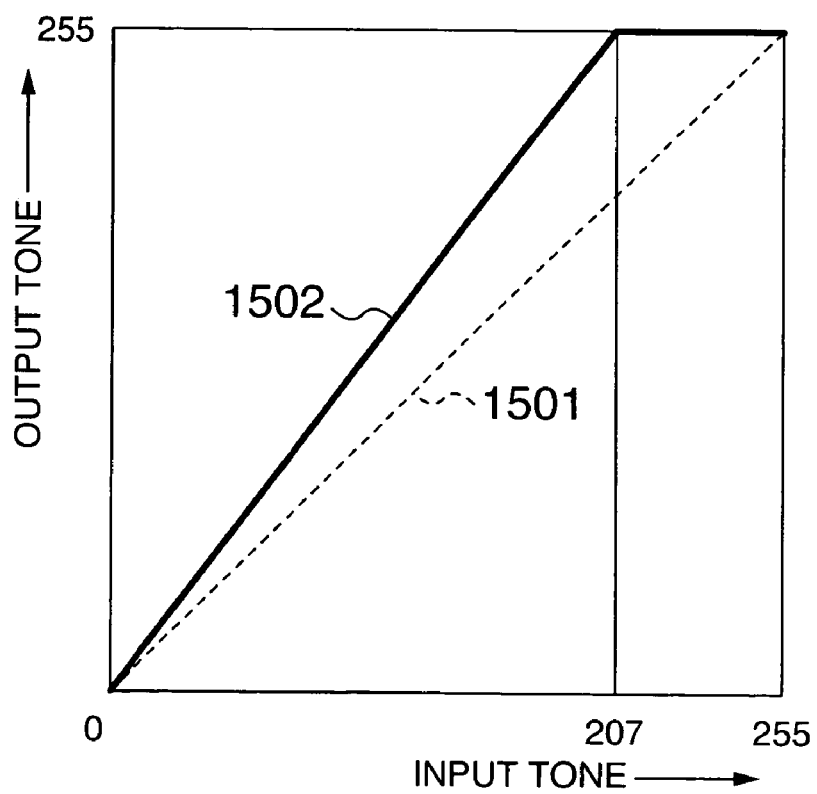

FIG. 15B shows a correction image by this correction characteristic. Dotted line 1501 represents the characteristic of the output tone with respect to the input tone when correction is not made. Solid line 1502 shows the case where correction is made. The gradient of the output tone with respect to the input tones 0 to 207 is great as 207 to 255 at which the tone of the input video signal does not exist are fixed to 255, and is expanded to 0 as the output dynamic range limit. Consequently, the contrast of the output tone with respect to the input tones can be increased and an image that can be more easily watched on the black side can be displayed.

FIG. 16 shows a correction example when a video signal having no tones on both black and white sides is inputted.

Figure 16A:
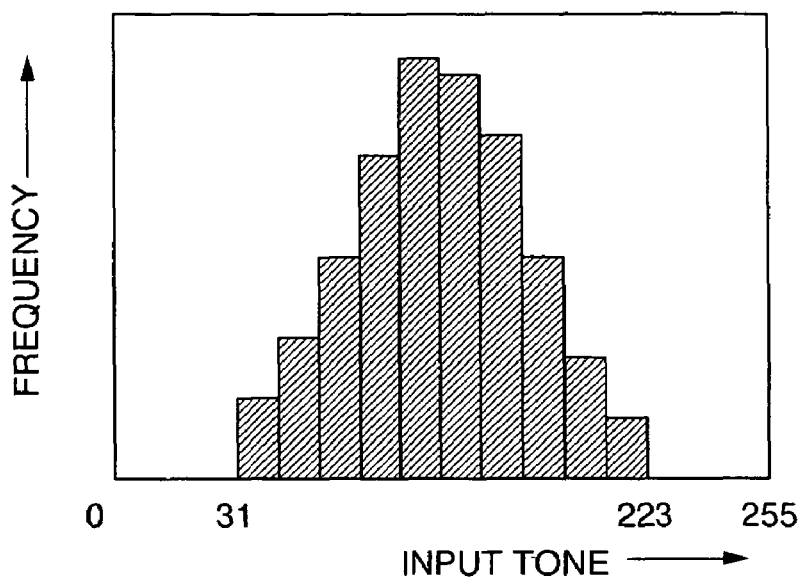
FIGS. 16A and 16B show an example of the luminance histogram and the correction characteristics.

FIG. 16A shows a luminance histogram of the inputted video signal. In this example, the tones from 0 to 31 (Yhst0 to 1) on the black side and tones from 223 to 255 (Yhst14 to 15) on the white side do not exist. When the example is applied to the processing flow shown in FIG. 13, Blacklevel=0 to 31, Whitelevel=223 to 255 and Ygain=1.33.

Figure 16B:
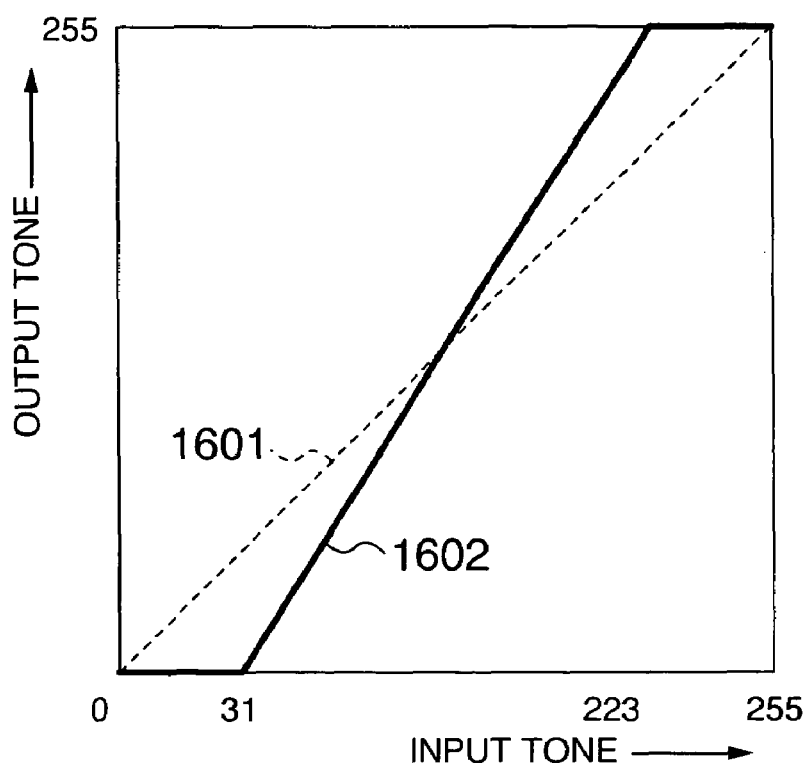

FIG. 16B shows a correction image by this correction characteristic. Dotted line 1601 represents the characteristic of the output tone with respect to the input tone when correction is not made. Solid line 1602 shows the correction characteristics. The gradient of the output tone with respect to the input tones 31 to 223 is increased as 0 to 31 and 223 to 255 at which the tone of the input video signal does not exist are fixed to 0 and 255, respectively, and is expanded from 0 to 255 as the output dynamic range limit. When correction is made in this way, the contrast of the intermediate tone can be increased and an image that can be more easily watched can be displayed.

Figure 17:
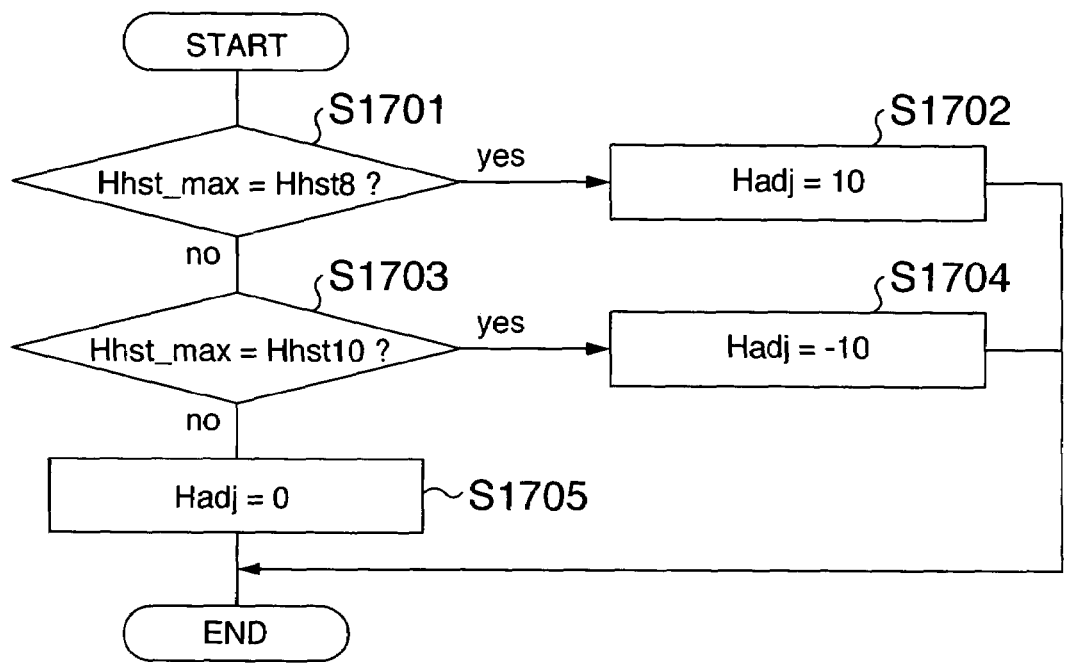
FIG. 17 shows a processing flow example of a hue correction portion in the correction portion.

FIG. 17 shows an example of the flowchart of hue correction. In this embodiment, the user selects in advance those colors which are desired to be clearly displayed or stressed from among yellow, red, magenta, blue, cyan, green, and so forth. Color correction is made by peak areas Hhst max of the color and hue histograms selected by the user. FIG. 17 shows the correction processing when blue is selected, for example. First, whether or not the peak Hhst max of the hue histogram corresponds to H hst8 as an area before the area H hst9 corresponding to blue is judged (S1701). The hue adjustment value Hadj is set to 10 (S1702) when the judgment result is Yes. When the result is No, whether or not the peak area Hhst max of the hue histogram corresponds to H hst10 as an area after the area H hst9 corresponding to blue is judged (S1703). The hue adjustment value Hadj is se to −10 when the judgment result is Yes (S1704). When the result is No, Hadj is set to 0 and the processing is completed. Consequently, the color set by the user can be stressed.

In the example shown in FIG. 17, correction is made on the basis of the color set in advance by the user but the correction method is not limited. For example, the color correction may be made by detecting the peak area of the hue histogram and correcting the colors of the areas before and after the peak area to the color of the peak area. In this way, hue can be adjusted to the blue side when a large number of components near the blue exit such as in the image of a beach, for example, and the image in which blue is stressed can be displayed.

Figure 18:
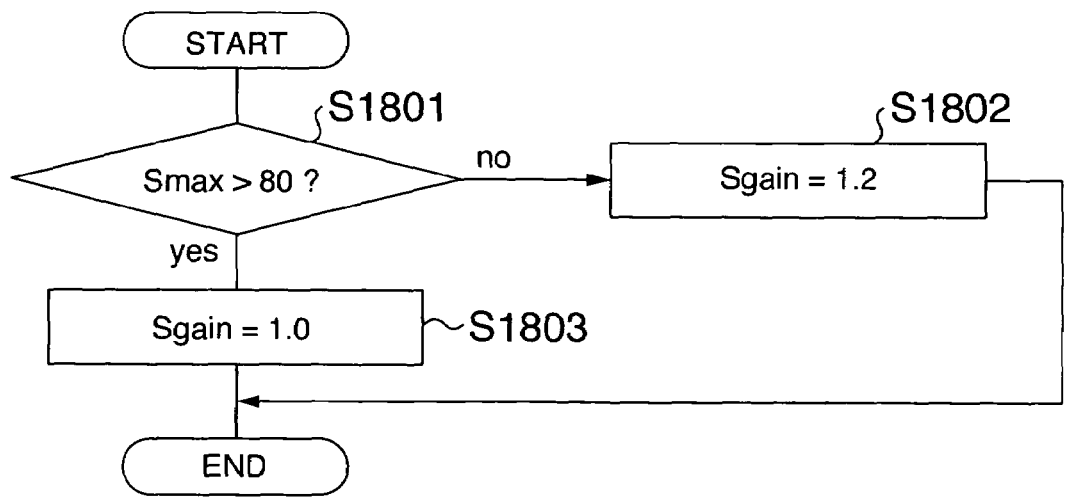
FIG. 18 shows a processing flow example of a saturation correction portion in the correction portion.

FIG. 18 shows an example of the flowchart of saturation correction. Whether or not a maximum level of saturation is 80 or below is judged (S1801). The gain Sgain of saturation is set to 1.2 when the judgment result is No (S1802). When the result is Yes, Sgain is set to 1.0 (S1803) and the processing is completed. Consequently, clear color display can be made by stressing the saturation gain when the maximum saturation is below a certain predetermined value. Incidentally, correction is made when the maximum saturation is below the predetermined value in the example shown in FIG. 18 but the invention is not limited to this example. The gain may be lowered to avoid the occurrence of color collapse when the maximum saturation exceeds a certain predetermined value.

A clear image having a high contrast can be watched while suppressing power consumption by detecting the scene change and conducting signal correction as explained above.

The timing at which the correction portion 152 applies correction of the input image signal may be immediately after the instruction from CPU 7 or after the passage of a predetermined time or frame. The correction may be conducted transiently in such a fashion as to gradually achieve the intended correction characteristics. The possibility of the occurrence of the block noise is high when CPU 7 judges that the compression ratio is high from header information of the image file before decoding or the reception condition is not good from the bit error acquired from the TV tuner 13. In such a case, the degree of correction is lowered so as to prevent the block noise from being stressed. When CPU 7 judges that the compression ratio is low, on the contrary, the possibility of the occurrence of the block noise is low. Therefore, higher image quality display may be made by increasing the degree of correction. When the compression ratio is high, the degree of correction is lowered by changing the limit value of Blacklevel to 23, or changing the hue adjustment value Hadj to 5 or changing the saturation gain Sgain to 1.1.

The embodiment given above explains the case where the image improving processing is accomplished by using the image improving circuit 15 but a part or the whole of the processing may be carried out software-wise by CPU 7 without using the image improving circuit 15 provided that CPU 7 has the processing capacity in reserve.

The embodiment given above explains the case where the scene change detection portion 1552 is disposed inside the I/F portion 155 and CPU 7 executes the generation/updating processing of the correction data by INT 141 from that block, but the processing may be executed when a specific picture such as an I picture or an IDR (Instantaneous Decoding Refresh) picture is generated when the encoded image is decoded.

Figure 19:
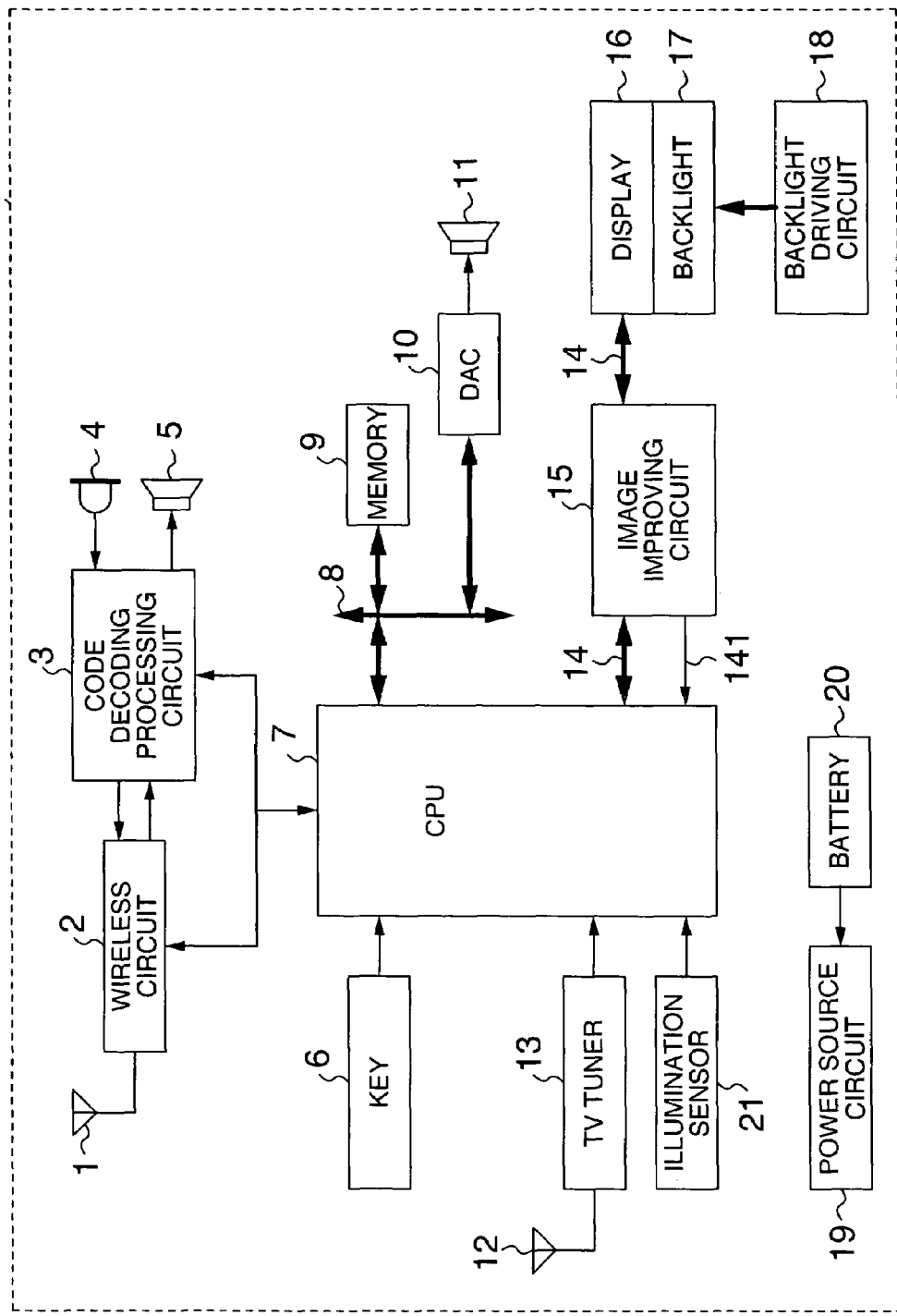
FIG. 19 is a block diagram showing a structural example of a mobile telephone.

FIG. 19 is a block diagram showing another structural example of the mobile telephone. The same reference numeral is used to identify the same portion as in FIG. 1 and its explanation is omitted. Because the mobile telephone is used at various places such as indoor and outdoor, the intensity of environmental illumination is different depending on the use condition. There is the problem that under the environment such as outdoor on a sunny day, environmental light is incident into the display 16 the display image on the low luminance side, or in other words, the tone on the black side, becomes difficult to discriminate. The mobile telephone shown in FIG. 19 has an illumination sensor 21 and add correction data by illumination to correction by the characteristic point of the input signal.

Figures 20, 21:
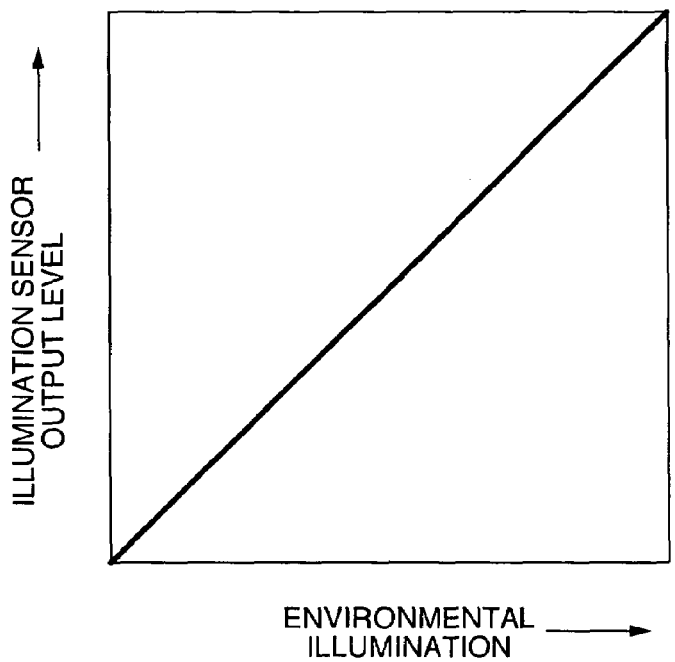
FIG. 20 shows input/output characteristics of an illumination sensor.
FIG. 21 shows an example of correction date.

The illumination sensor 21 is constituted by photo-transistors and photo-diodes. FIG. 20 shows an example of output characteristics of the illumination sensor 21. The abscissa represents environmental illumination and the ordinate does the output level of the illumination sensor. It will be assumed that the output level of the illumination sensor 21 increases as the intensity of environmental illumination increases. In this embodiment, an illumination sensor 7 is disposed as means for detecting the intensity of illumination but the intensity of illumination may be detected by using an output signal of CMOS or CCD camera.

The memory 9 stores correction data for correcting the output tone when the intensity of illumination detected by the illumination sensor 21 exceeds a predetermined value. FIG. 21 shows an example of the correction data. The correction value for each tone area Yhst is set. In this embodiment, the output tone on the black side is corrected so that the tones on the black side can be more easily distinguished. Incidentally, this embodiment uses one kind of correction data when the intensity of illumination exceeds the predetermined value but a plurality of kinds of correction data may be disposed by changing the size of the correction value or the tone range to be corrected. These correction data may be stored in the memory 9 or may be calculated by using the correction data shown in FIG. 21 as the reference data and by multiplying the reference data by a coefficient in accordance with the intensity of illumination.

Figure 22:
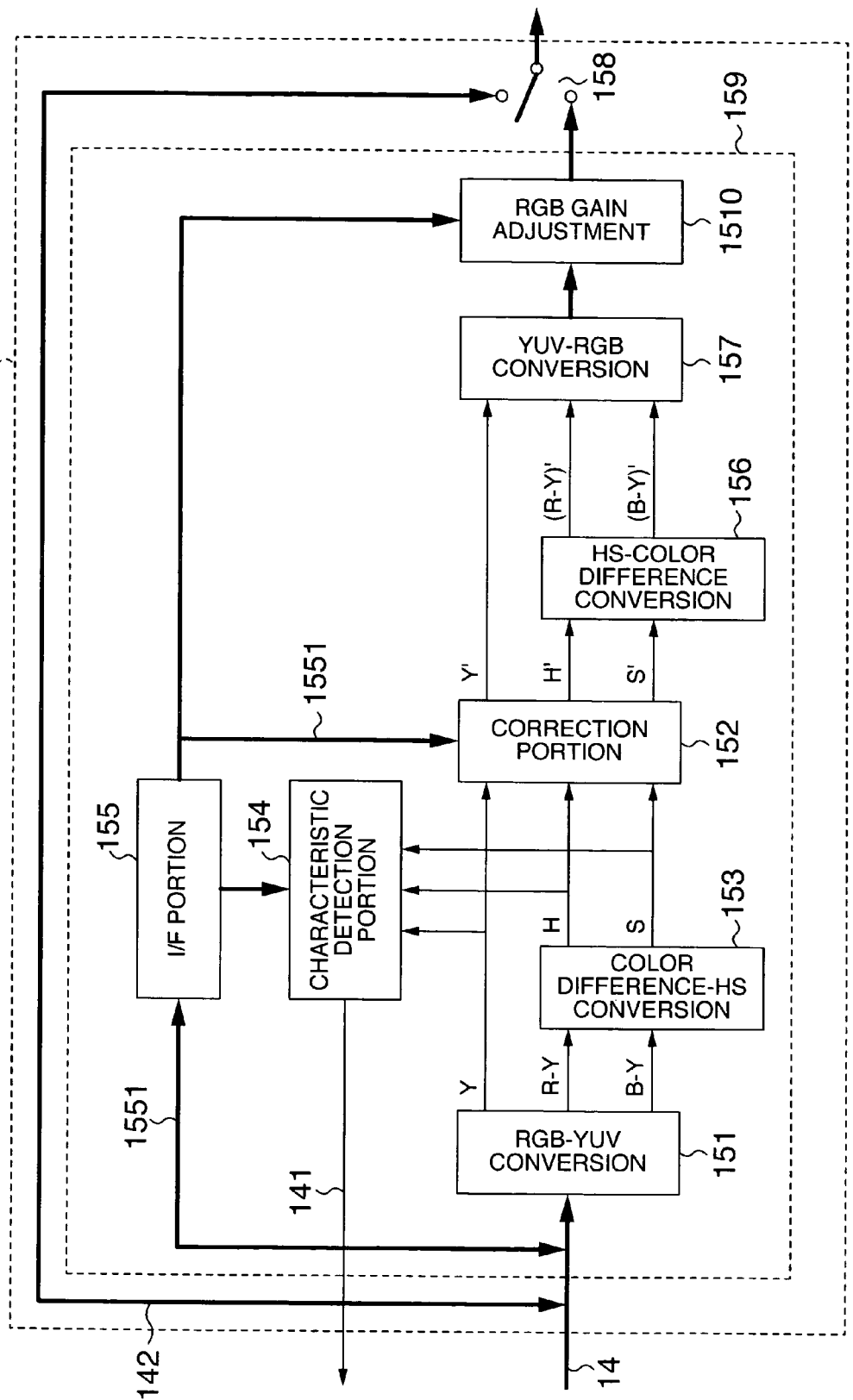
FIG. 22 is a block diagram showing a structural example of an image improving circuit.

FIG. 22 is an internal block diagram of the image improving circuit 15. An RGB gain adjustment portion 1510 is added to the image improving circuit shown in FIG. 2. The same reference numeral is used to identify the same portion as in FIG. 1 and its explanation will be omitted.

The intensity of illumination detected by the illumination sensor 7 is inputted to CPU 7. When the intensity of illumination exceeds the predetermined value, CPU 7 outputs a control signal instructing correction of the output tone to the RGB gain adjustment portion 1510. The RGB gain adjustment portion 1510 reads out the correction data from the memory 9 through the I/F portion in accordance with control from CPU 7 and adjusts the gain of the video signal. The adding operation of the correction data by the intensity of illumination executed by the RGB gain adjustment portion 1510 will be explained with reference to FIG. 23.

Figure 23A:
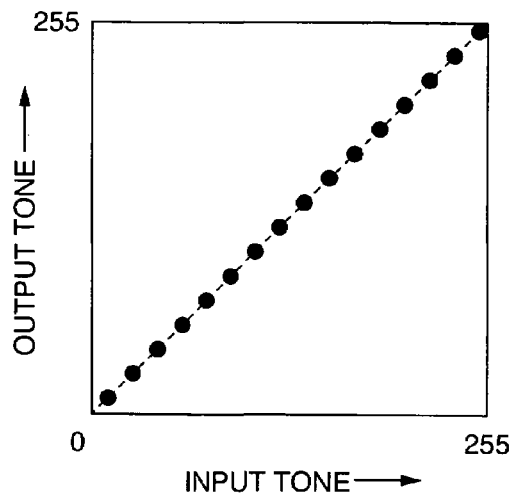
FIGS. 23A to 23D show characteristic examples of an output tone with respect to an input tone of a luminance signal.
Figure 23B:
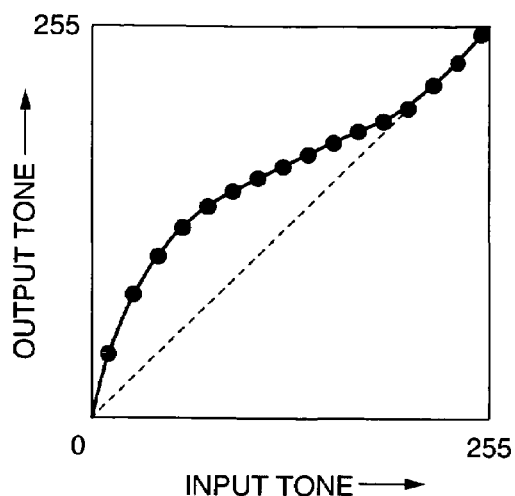

FIG. 23A shows the characteristic of the output tone with respect to the input tone of the luminance signal when Blacklevel=0 and Whitelevel=255 and correction is not made by the correction portion 152. When the intensity of illumination is above the predetermined value, the output tone with respect to the input tone is corrected as shown in FIG. 23B. More concretely, an image that can be watched easily even a bright environment can be displayed as the RGB gain adjustment portion 1510 executes correction in such a fashion as to stress the output tone on the black side. When the intensity of illumination is less than the predetermined value, correction by the RGB gain adjustment portion 1510 is not made and the output tone with respect to the input tone remains as shown in FIG. 23A.

Figure 23C:
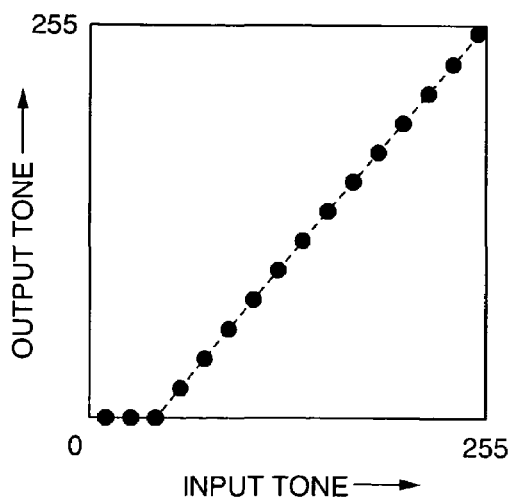
Figure 23D:
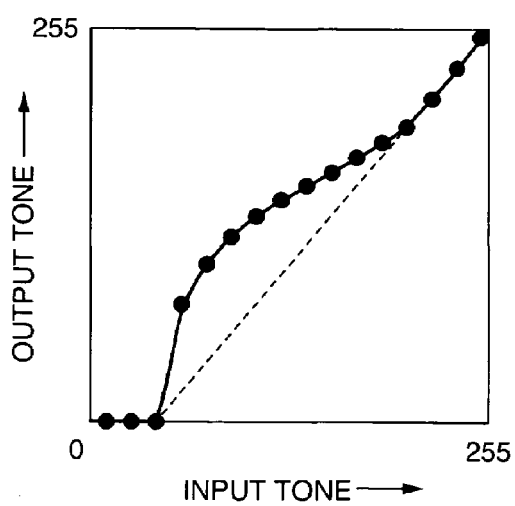

FIG. 23C shows the state where Blacklevel=0 to 47 and Whitelevel=255 and the output tone with respect to the input tone 47 to 255 is corrected by the correction portion 152. When the intensity of illumination is above the predetermined value, the RGB gain adjustment portion 1510 corrects the output tone with respect to the input tone by using the correction data read out from the memory 9. In this embodiment, control is made in such a fashion that correction by the RGB gain adjustment portion 11510 is not made for the range of Blacklevel=0 to 47. However, serious problems do not occur by conducting the gain adjustment when the correction amount of the RGB gain adjustment portion 1510 is below the predetermined value.

In the embodiment described above, the tone on the black side is stressed in accordance with the intensity of illumination but this method is not restrictive and correction may be made in accordance with colors of environmental light. For example, when environmental light is reddish such as evening sun, there is the problem that the colors of the display image become reddish, too, due to influences of environmental light.

To solve this problem, the illumination sensor 21 has three independent detection devices for RGB (Red-Green-Blue) and CPU 7 calculates the proportion of these detection devices. Consequently, the correction is made depending on the colors in addition to the intensity of environmental light.

CPU 7 calculates the proportion of each output color of RGB of the illumination sensor 21 and executes control so that the RGB gain adjustment portion 1510 lowers the correction value for the color having a large proportion when any of RGB has a large proportion. For example, CPU 7 gives an instruction to lower the R correction data with respect to G and B to the RGB gain adjustment portion 1510 when detecting that the R component is great in environmental light such as when environmental light is evening sun or an electric bulb.

Figure 24A:
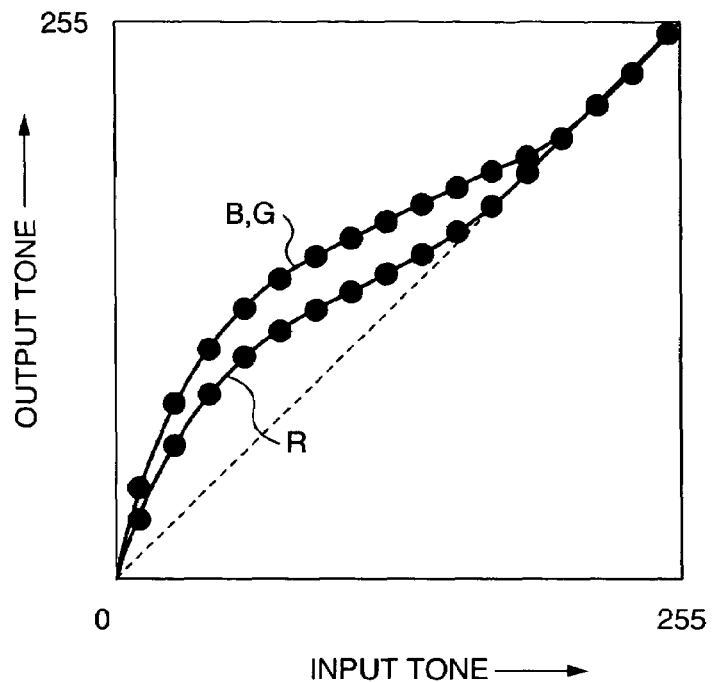
FIGS. 24A and 24B show characteristic examples of the output tone with respect to the input tone of the luminance signal.
Figure 24B:
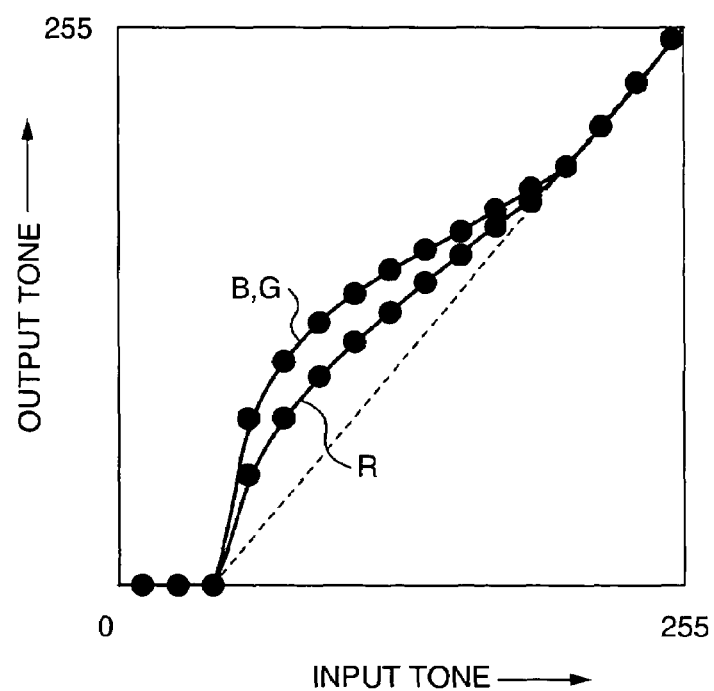

FIG. 24A shows the condition where the RGB gain adjustment portion 1510 corrects the output tone when the output tone of the luminance signal with respect to the input tone is not corrected by the correction portion 152. FIG. 24B shows the condition where the RGB gain adjustment portion 1510 corrects the output tone when the output tone with respect to the input tones 47 to 255 is corrected by the correction portion 152. In each case, correction is so made as to lower the R gain with respect to G and B. In consequence, it is possible to keep the ratio of RGB on the display 16 at a desired ratio and to make satisfactory display.

The explanation given above explains the example where the R component is great in environmental illumination, but correction can be similarly made when G or B is great in environmental illumination.

The colors of the backlight 17 may be corrected in accordance with the colors of environmental illumination in addition to the change of the input signal.

Figure 25:
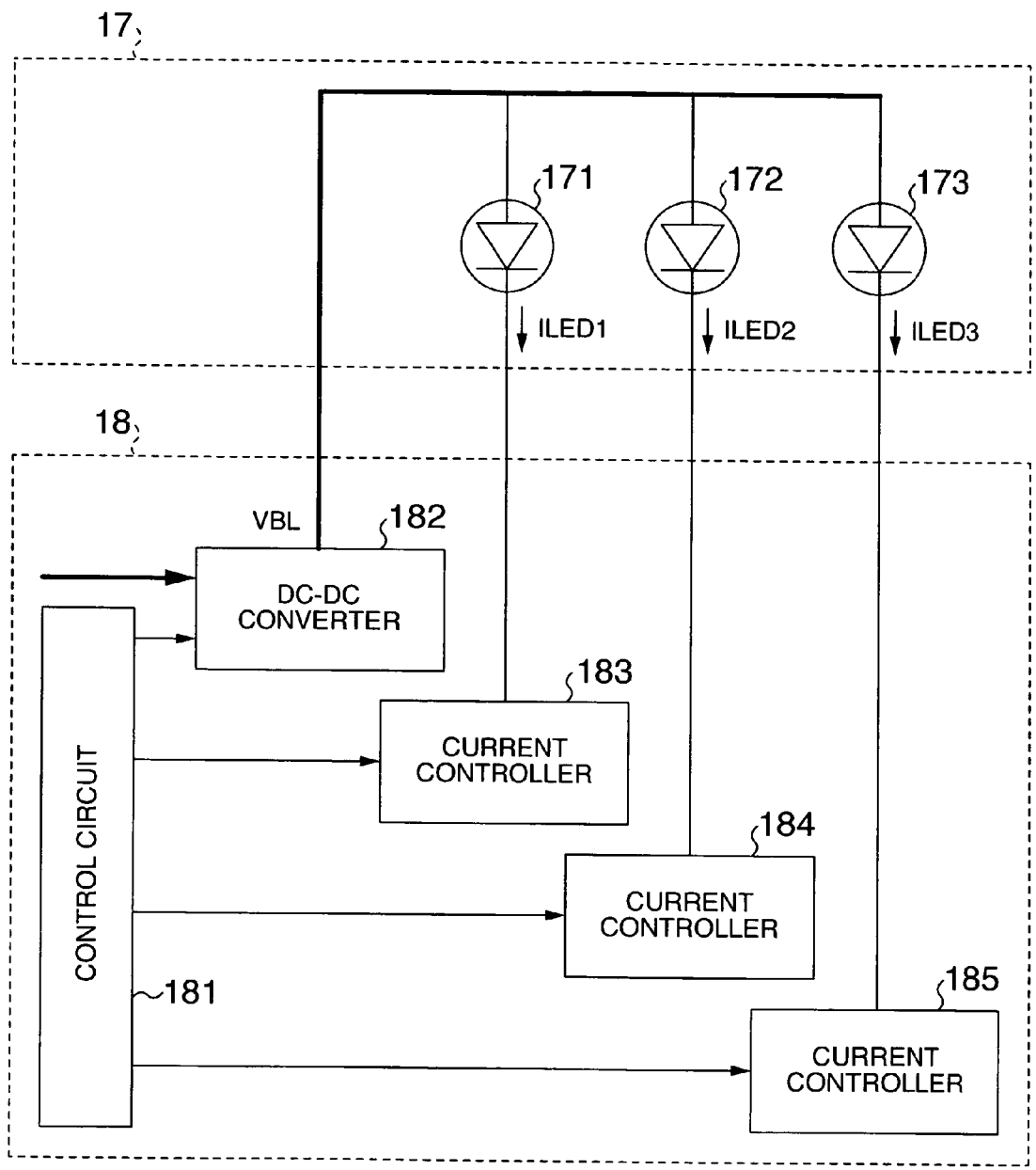
FIG. 25 is a block diagram showing a structural example of a backlight and a backlight driving circuit.

FIG. 25 shows a structural example of the backlight 17 and the backlight driving circuit 18. Light source devices (LED) 171 to 173 are R-LED, G-LED and B-LED, respectively. Current control means 183 to 185 individually control the currents of LED171 to LED 173, respectively, on the basis of the instruction of the control circuit 181. A DC-DC converter 182 boosts or lowers the voltage supplied from the battery 20 in such a fashion as to drive LED 171 to 173. The control circuit 181 sets the current values of the current controllers 183 to 185 in accordance with the instruction of CPU 7. Generally, the luminous intensity of LED 171 to 173 is proportional to the current flowing between the anode and the cathode. Therefore, the luminous intensity or luminosity for controlling the currents of LED 171 to 173 can be individually controlled from CPU 7 through the control circuit 181 and the adjusting means 183 to 185.

Figure 26:
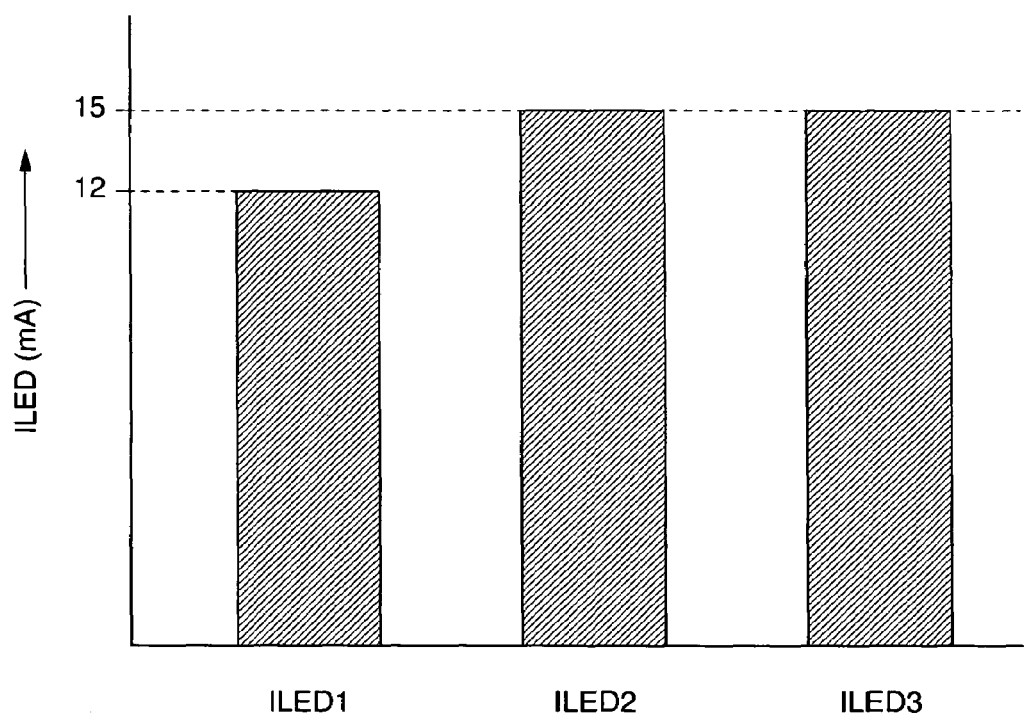
FIG. 26 shows an example of an LED current value.

FIG. 26 shows a control example of LED 171 to 173 when the R component is great in environmental illumination. The ordinate represents the current caused to flow through LED 171 to 173. When the R component is great, control is so made as to decrease the current of R-LED 171 to be smaller than the currents of LED 172 and 173. This control makes it possible to prevent the colors of the display image from changing due to the colors of environmental illumination. Though this explanation explains the example where the R component is great in environmental illumination, the current of the green LED 172 needs be made smaller than those of R and B when G is great in environmental illumination, and when B is great in environmental illumination, the current of B-LED 173 is decreased to be smaller than those of R and G.

This example uses one each R-LED 171, G-LED 172 and B-LED 173 as the light source devices, the number is not limited to 1 and the control method of the invention may be applied to the case where an LED array type backlight having a plurality of fine LED for each color or a self emitting nature type display such as an organic EL display is used as the light source.

The explanation given above explains the example where the colors of environmental illumination are corrected by the backlight 17. When the intensity of illumination is high, a satisfactory image can be watched by increasing the currents of LED 171 to 173 at the same proportion. When the intensity of environmental illumination is low, on the contrary, low power consumption can be achieved by decreasing the currents of LED 171 to 173 at the same proportion.

Though the invention has thus been explained about the mobile telephone by way of example, the application of the invention is not limited to the mobile telephone. In other words, the invention may be applied to any image processing apparatuses as long as they can let the users watch images. For example, they may be terminal devices not having the communication function. Because low power consumption can be achieved with high image quality display, the invention is particularly effective for mobile devices operated by the battery but may be terminal devices of the installation type that operates by the supply of power from the home plug socket.

The embodiments of the invention described above can provide an image processing apparatus and a mobile terminal device that are easier to operate.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus comprising:
   an input portion to which video signals are inputted;
   an illumination sensor for detecting illumination;
   a corrector which corrects the video signals inputted to the input portion; and
   a controller which executes control so that the correction portion corrects the video signals in accordance with distribution of luminance or hue or saturation of the video signals and with the illumination detected by the illumination sensor when any change occurs in the video signal inputted to the input portion,
   wherein the controller corrects luminance of the video signal without correcting hue and saturation of the video signal when the change of the video signal does not occur and when the illumination detected by the illumination sensor is above a predetermined value.

2. An image processing apparatus according to claim 1, wherein the corrector executes correction in such a fashion as to increase an illumination tone on black side of the video signal.

* * * * *